US012015863B2

(12) United States Patent
Hanzawa

(10) Patent No.: US 12,015,863 B2
(45) Date of Patent: Jun. 18, 2024

(54) IMAGING CIRCUIT, IMAGING DEVICE, AND IMAGING METHOD

(71) Applicant: Sony Semiconductor Solutions Corporation, Kanagawa (JP)

(72) Inventor: Katsuhiko Hanzawa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 143 days.

(21) Appl. No.: 17/790,028

(22) PCT Filed: Jan. 14, 2021

(86) PCT No.: PCT/JP2021/001010
§ 371 (c)(1),
(2) Date: Jun. 29, 2022

(87) PCT Pub. No.: WO2021/166503
PCT Pub. Date: Aug. 26, 2021

(65) Prior Publication Data
US 2022/0394206 A1 Dec. 8, 2022

(30) Foreign Application Priority Data

Feb. 18, 2020 (JP) ................................ 2020-025437

(51) Int. Cl.
*H04N 25/767* (2023.01)
*H04N 25/75* (2023.01)
(52) U.S. Cl.
CPC ........... *H04N 25/767* (2023.01); *H04N 25/75* (2023.01)

(58) Field of Classification Search
CPC ...... H04N 25/767; H04N 25/75; H04N 25/47; H04N 25/78; H04N 25/70
See application file for complete search history.

(56) References Cited

U.S. PATENT DOCUMENTS 9,739,660 B2 * 8/2017 Suh ........................... G01J 1/44
2014/0093015 A1 * 4/2014 Xiu ........................ H03L 7/0991
375/340

(Continued)

FOREIGN PATENT DOCUMENTS

JP 2016-533140 A 10/2016
JP 2017050853 A 3/2017

(Continued)

OTHER PUBLICATIONS

International Search Report (PCT/ISA/210), International Application No. PCT/JP2021/001010, dated Apr. 6, 2021.

*Primary Examiner* — Shahbaz Nazrul
(74) *Attorney, Agent, or Firm* — Michael Best & Friedrich LLP

(57) ABSTRACT

Imaging circuits, devices and methods are disclosed. In one example, an imaging circuit includes circuit blocks each including a photoelectric conversion element configured to photoelectrically convert incident light to generate a photocurrent and a current-voltage conversion circuit configured to convert the photocurrent into a voltage signal, a quantizer configured to generate a detection signal of an address event in accordance with a result of comparing the voltage signal supplied from at least one of the plurality of circuit blocks with a threshold, a demultiplexer connected to a subsequent stage of the quantizer, and latch circuits connected to different output terminals of the demultiplexer.

15 Claims, 32 Drawing Sheets

(56) References Cited

U.S. PATENT DOCUMENTS

| | | | |
|---|---|---|---|
| 2015/0069218 A1* | 3/2015 | Cho .................. | H01L 27/14601 250/208.1 |
| 2016/0227135 A1 | 8/2016 | Matolin et al. | |
| 2018/0262703 A1* | 9/2018 | Kim ..................... | H04N 25/766 |
| 2019/0222444 A1* | 7/2019 | Sreeramaneni ... | H04L 25/03057 |
| 2020/0058205 A1* | 2/2020 | Yaffe ..................... | H04N 23/56 |

FOREIGN PATENT DOCUMENTS

| | | |
|---|---|---|
| JP | 2017085549 A | 5/2017 |
| JP | 2017520134 A | 7/2017 |

* cited by examiner

IMAGING CIRCUIT, IMAGING DEVICE, AND IMAGING METHOD

TECHNICAL FIELD

The present disclosure relates to an imaging circuit, an imaging device, and an imaging method.

BACKGROUND ART

In a general imaging device, a synchronous imaging element that captures image data (frames) at a timing of a synchronization signal is often used. However, the synchronous imaging element can obtain image data only for each cycle (for example, 1/60 seconds) of the synchronization signal and is not suitable for purpose of acquiring image data at higher speed. Thus, an asynchronous imaging element has been proposed. A pixel of the asynchronous imaging element includes an event detection circuit capable of detecting that a light amount exceeds a threshold as an event in real time for each address.

CITATION LIST

Patent Document

Patent Document 1: Japanese Patent Application Laid-Open No. 2016-533140

SUMMARY OF THE INVENTION

Problems to be Solved by the Invention

An asynchronous imaging element can generate and output data at higher speed than a synchronous imaging element. Use of the asynchronous imaging element achieves improvement in safety, for example, in a traffic field, by executing processing of recognizing an image of a person or an obstacle at high speed. However, providing an address event detection circuit for each pixel causes a problem that a mounting area becomes larger than that of the synchronous imaging element.

The present disclosure provides an imaging circuit, an imaging device, and an imaging method capable of performing high-speed reading while reducing a circuit scale.

Solutions to Problems

An aspect of an imaging circuit according to the present disclosure may include: a plurality of circuit blocks each including a photoelectric conversion element configured to photoelectrically convert incident light to generate a photocurrent, and a current-voltage conversion circuit configured to convert the photocurrent into a voltage signal; a quantizer configured to generate a detection signal of an address event in accordance with a result of comparing the voltage signal supplied from at least one of the plurality of circuit blocks with a threshold; a demultiplexer connected to a subsequent stage of the quantizer; and a plurality of latch circuits connected to different output terminals of the demultiplexer.

Each of the plurality of latch circuits may be configured to store the address event detected by the quantizer.

The number of the latch circuits may be equal to or larger than two and equal to or smaller than twice the number of the photoelectric conversion elements.

Each of the plurality of circuit blocks may include a buffer circuit configured to perform impedance conversion, and a subtractor configured to convert the voltage signal into a differential voltage.

The quantizer may detect an ON event in a case where the voltage signal supplied from at least one of the plurality of circuit blocks exceeds a first threshold voltage.

The quantizer may detect an OFF event in a case where the voltage signal supplied from at least one of the plurality of circuit blocks falls below a second threshold voltage.

The imaging circuit may be configured to read both the ON events and the OFF events for at least some selected photoelectric conversion elements among the plurality of photoelectric conversion elements and store the ON events and the OFF events in the plurality of latch circuits.

The imaging circuit may be configured to read both the ON events and the OFF events for the remaining photoelectric conversion elements among the plurality of photoelectric conversion elements after the ON events and the OFF events stored in the plurality of latch circuits are transferred via a read line and store the ON events and the OFF events in the plurality of latch circuits.

The plurality of photoelectric conversion elements may be arranged in a direction substantially perpendicular to read lines.

The plurality of photoelectric conversion elements may be arranged in a direction substantially parallel to read lines.

An aspect of an imaging device according to the present disclosure may include a storage unit; and a plurality of imaging circuits, in which a plurality of latch circuits respectively included in the imaging circuits may be connected to different read lines, the corresponding latch circuits of the plurality of imaging circuits may be connected to the same read line, and the storage unit may be connected to a subsequent stage of a plurality of the read lines.

The imaging device may be configured to transfer the address event stored in the latch circuit to the storage unit for each of the imaging circuits.

The imaging device may be configured to alternately read an ON event or an OFF event stored in the latch circuit and transfer the ON event or the OFF event to the storage unit for each of the imaging circuits.

An aspect of an imaging device according to the present disclosure may include: a storage unit; and a plurality of imaging circuits, in which a plurality of latch circuits respectively included in the imaging circuits is connected to some of a plurality of the read lines, the plurality of latch circuits respectively included in the imaging circuits is divided into groups each connected to the same read line, the read lines to which the plurality of latch circuits is connected are different depending on the imaging circuits, and the storage unit is connected to a subsequent stage of a plurality of the read lines.

The imaging device may be configured to read the address event stored in one of the latch circuits belonging to each of the groups for a plurality of the imaging circuits and transfer the address event to the storage unit.

The address event read from each of the imaging circuits and transferred to the storage unit may include both an ON event and an OFF event.

The imaging device may be configured to alternately read ON events or OFF events stored in the latch circuits and transfer the ON events or the OFF events to the storage unit for the plurality of imaging circuits.

An imaging method according to the present disclosure includes: a step of outputting a voltage signal from at least one of a plurality of circuit blocks each including a photoelectric conversion element configured to photoelectrically convert incident light to generate a photocurrent and a current-voltage conversion circuit configured to convert the photocurrent into the voltage signal and supplying the voltage signal to a quantizer;

a step of generating, at the quantizer, a detection signal of an address event in accordance with a result of comparing the voltage signal with a threshold;

a step of outputting the detection signal generated by the quantizer while demultiplexing the detection signal into a plurality of systems at a demultiplexer; and a step of latching the detection signal at a plurality of latch circuits corresponding to the plurality of systems.

MODE FOR CARRYING OUT THE INVENTION

Figure 1:
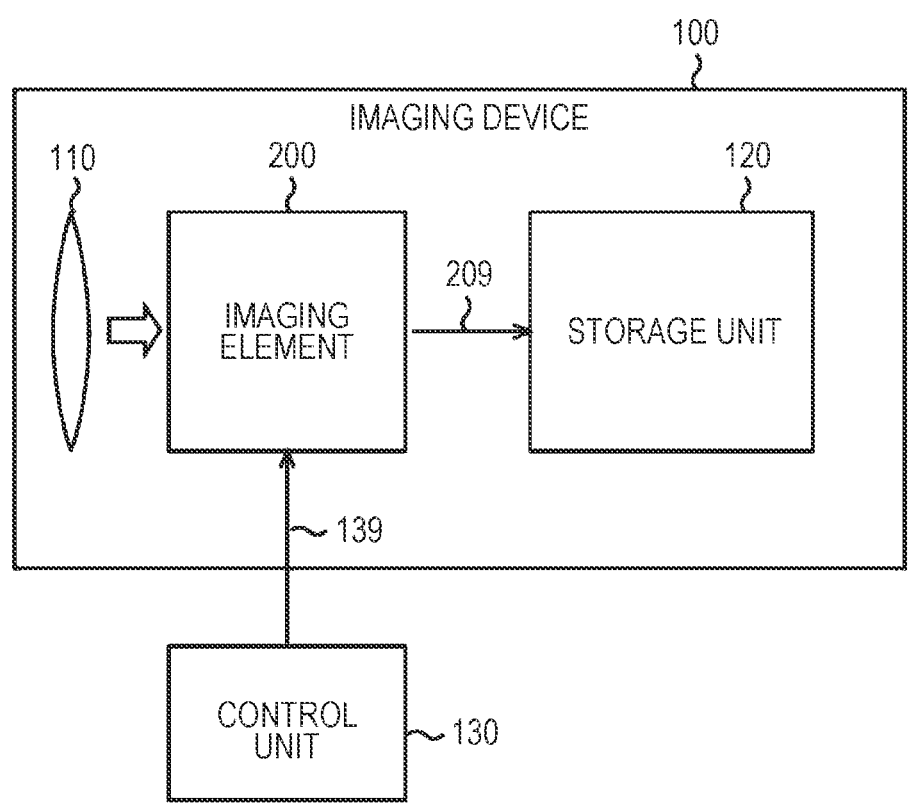
FIG. 1 is a block diagram illustrating a configuration example of an imaging device according to the present disclosure.

Hereinafter, preferred embodiments of the present disclosure will be described in detail with reference to the accompanying drawings. Note that, in the present specification and the drawings, components having substantially the same functional configuration will be denoted by the same reference numerals, and redundant description will be omitted.

Configuration Example of Imaging Device

FIG. 1 is a block diagram illustrating a configuration example of an imaging device according to the present disclosure. An imaging device 100 in FIG. 1 includes an imaging lens 110, an imaging element 200, a storage unit 120, and a control unit 130. The imaging device 100 is, for example, a camera mounted on a wearable device or an in-vehicle camera.

The imaging lens 110 condenses incident light on the imaging element 200.

The imaging element 200 has a plurality of pixels. Each of the plurality of pixels generates an address event in a case where an absolute value of a luminance change amount exceeds a threshold. The address event includes, for example, an ON event and an OFF event. Here, the ON event indicates that detected luminance exceeds a first threshold. The OFF event indicates that detected luminance falls below a second threshold. For example, a value greater than a reference value can be used as the first threshold. In addition, a value smaller than the reference value can be used as the second threshold. However, a method for setting the first threshold and the second threshold is not limited.

Each pixel of the imaging element 200 outputs a detection signal indicating a detection result of the address event. Each of the detection signals includes, for example, an ON event detection signal VCH indicating presence or absence of an ON event and an OFF event detection signal VCL indicating presence or absence of an OFF event. Note that the pixels in the imaging element 200 may detect both an ON event and an OFF event or may detect one of these events.

The imaging element 200 can generate image data from the detection signal. Furthermore, the imaging element 200 executes predetermined processing such as recognition processing on the image data. Then, the imaging element 200 outputs the processed data to the storage unit 120 via a signal line 209.

The storage unit 120 records the data output from the imaging element 200. The control unit 130 controls the imaging element 200 to capture image data at a desired timing.

Configuration Example of Imaging Element

Figure 2:
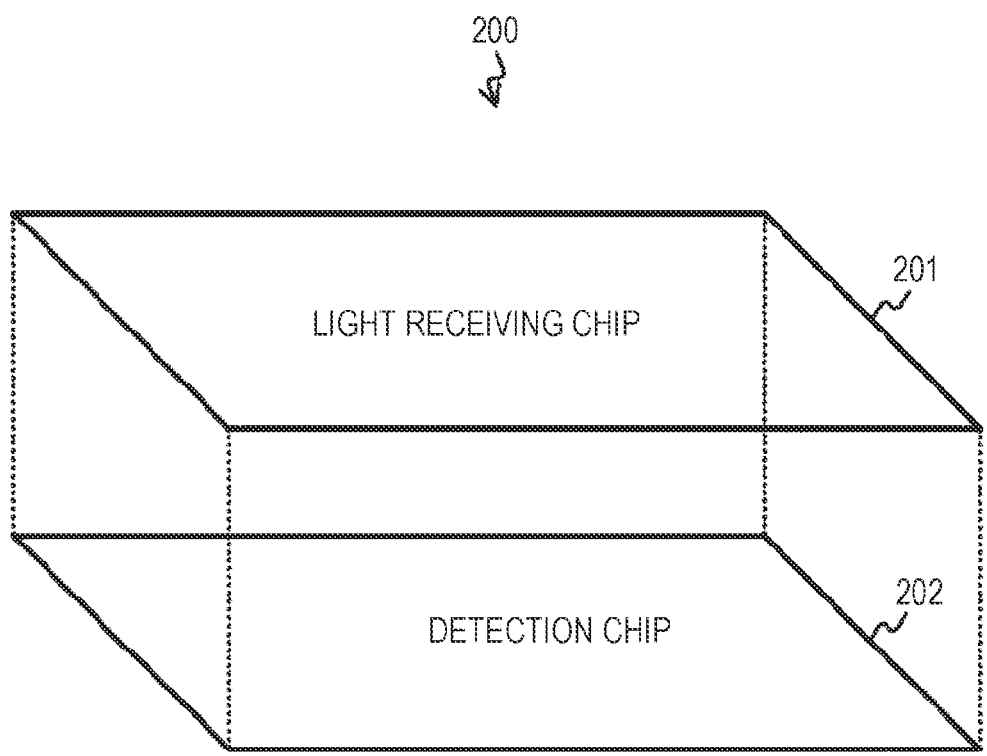
FIG. 2 is a view illustrating an example of a stacked structure of an imaging element.

FIG. 2 illustrates an example of a stacked structure of the imaging element 200. The imaging element 200 in FIG. 2 includes a detection chip 202 and a light receiving chip 201 stacked on the detection chip 202. These chips can be electrically connected to each other via a connecting portion such as a via. The chips may be electrically connected, for example, through a Cu—Cu junction or a bump as well as a via.

Figure 3:
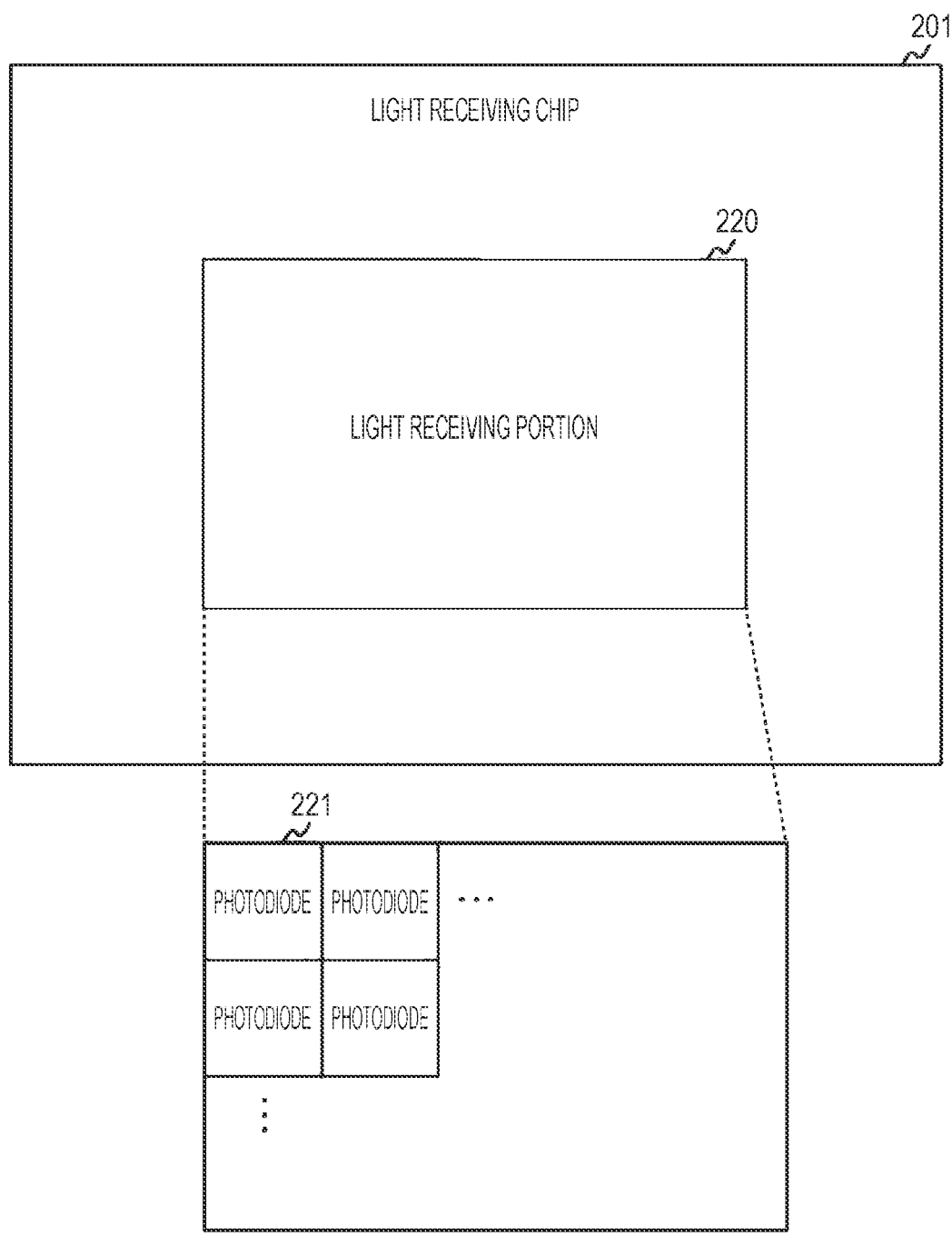
FIG. 3 is a plan view illustrating an example of a light receiving chip according to the present disclosure.

FIG. 3 is a plan view illustrating an example of the light receiving chip 201. The light receiving chip 201 is provided with a light receiving portion 220. In the light receiving portion 220, a plurality of photodiodes 221 is arranged in a two-dimensional lattice pattern. The photodiode 221 is configured to photoelectrically convert incident light to generate a photocurrent. For example, a pixel address including a row address and a column address is assigned to each of these photodiodes 221. It is therefore possible to designate a row address, a column address or a pixel address and perform various kinds of control.

Figure 4:
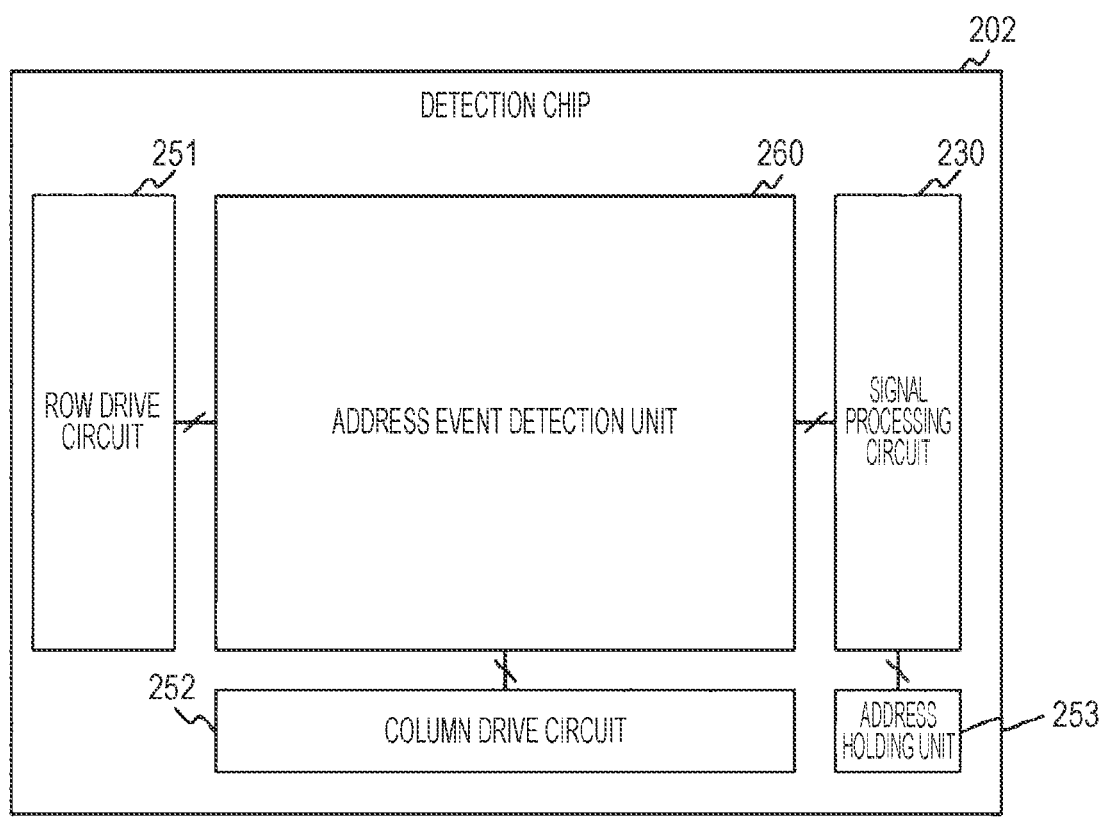
FIG. 4 is a plan view illustrating an example of a detection chip according to the present disclosure.

FIG. 4 is a plan view illustrating an example of the detection chip 202. The detection chip 202 of FIG. 4 includes a signal processing circuit 230, a row drive circuit 251, a column drive circuit 252, an address holding unit 253, and an address event detection unit 260.

The address event detection unit 260 generates an address event when an absolute value of a luminance change amount exceeds a predetermined threshold for each of the plurality of photodiodes 221 (pixels). Then, the address event detection unit 260 generates a detection signal indicating a detection result of the address event for each pixel. Then, the address event detection unit 260 inputs a detection signal to the signal processing circuit 230 in accordance with an enable signal.

Here, the enable signal is a signal that specifies whether or not to enable an output of the detection signal for each pixel. In a case where the enable signal has a waveform that enables the output, the detection signal is output from the corresponding pixel. On the other hand, in a case where the enable signal has a waveform that disables the output, the detection signal is not output from the corresponding pixel.

The row drive circuit 251 is configured to select a row address and output a detection signal corresponding to the row address to the address event detection unit 260.

The column drive circuit 252 is configured to select a column address and output a detection signal corresponding to the column address to the address event detection unit 260.

The address holding unit 253 is configured to hold a pixel address of a defective pixel in which an abnormality has occurred.

The signal processing circuit 230 executes predetermined signal processing on the detection signal from the address event detection unit 260. The signal processing circuit 230 arranges the detection signals in a two-dimensional lattice pattern as pixel signals to acquire image data. Then, the signal processing circuit 230 executes signal processing such as image recognition processing on the image data.

Note that the signal processing circuit 230 may have a function of acquiring a detection frequency of an address event for each pixel and specifying a defective pixel on the basis of a statistic of the detection frequency. In this case, the signal processing circuit 230 holds the pixel address of the defective pixel in the address holding unit 253. Furthermore, the signal processing circuit 230 generates an enable signal for each pixel and supplies the enable signal to the address event detection unit 260. For the enable signal corresponding to the defective pixel, an enable signal having a waveform that disables the output is output.

Figure 5:
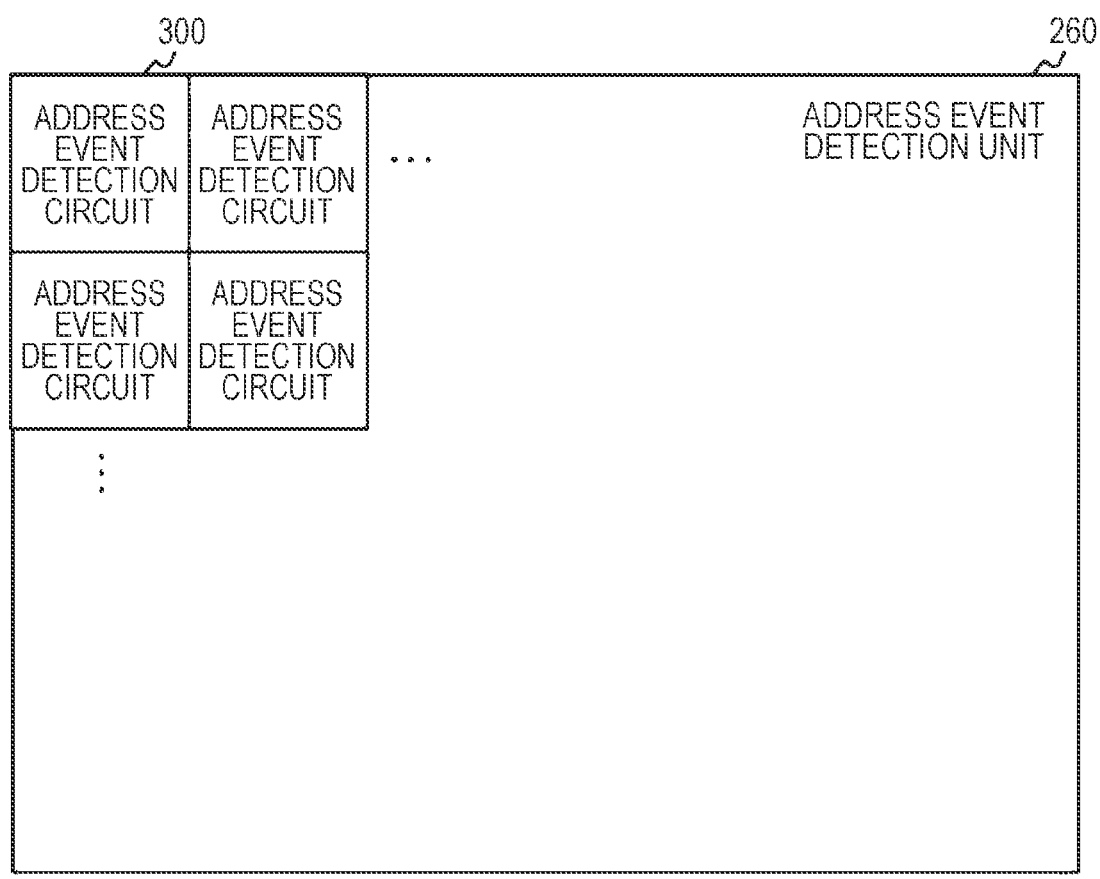
FIG. 5 is a plan view illustrating an example of an address event detection unit.

FIG. 5 is an example of a plan view of the address event detection unit 260. In FIG. 5, in the address event detection unit 260, a plurality of address event detection circuits 300 is arranged in a two-dimensional lattice pattern. A pixel address is assigned to each address event detection circuit 300. In addition, the address event detection circuit 300 is connected to the photodiode 221 having the same address or the corresponding address.

The address event detection circuit 300 is configured to quantize the voltage signal in accordance with the photocurrent from the corresponding photodiode 221. In addition, the address event detection circuit 300 is configured to output the voltage signal quantized in accordance with the enable signal as a detection signal.

Configuration Example of Address Event Detection Circuit

Figure 6:
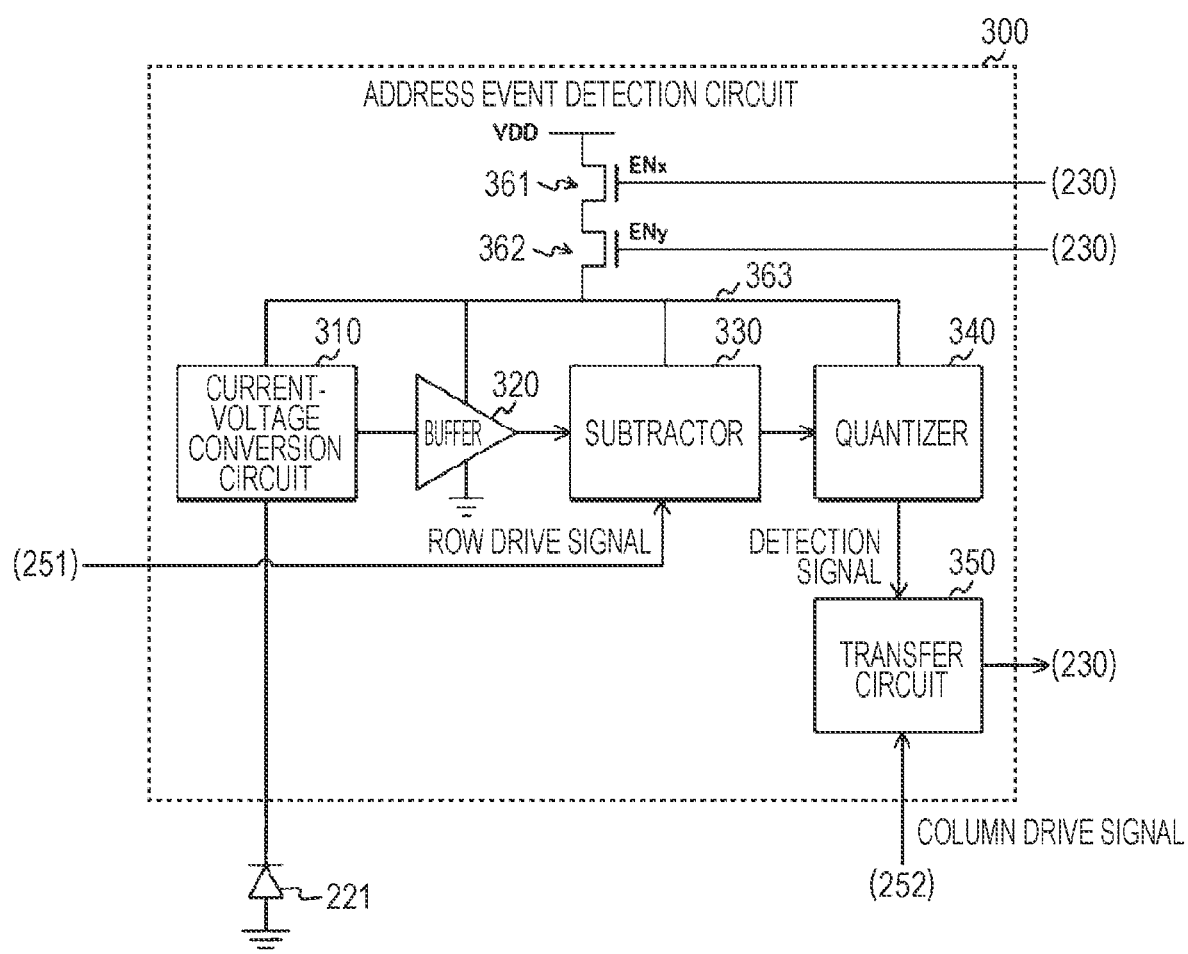
FIG. 6 is a block diagram illustrating a configuration example of an address event detection circuit.

FIG. 6 is a block diagram illustrating a configuration example of the address event detection circuit 300. The address event detection circuit 300 in FIG. 6 includes a current-voltage conversion circuit 310, a buffer 320, a subtractor 430, a quantizer 340, a transfer circuit 350, and N-type transistors 361 and 362.

The current-voltage conversion circuit 310 is configured to convert a current signal from the corresponding photodiode 221 into a voltage signal. In addition, the current-voltage conversion circuit 310 supplies the voltage signal to the buffer 320.

The buffer 320 is configured to output the input voltage signal to the subtractor 430. Use of the buffer 320 can increase power for driving a subsequent circuit. In addition, the buffer 320 can ensure noise isolation associated with switching operation in the subsequent stage.

The subtractor 430 is configured to obtain a change amount of a correction signal by executing subtraction processing. The subtractor 430 supplies the change amount as a differential signal to the quantizer 340 in the subsequent stage.

The quantizer 340 is configured to compare the differential signal with a predetermined threshold and convert an analog differential signal to a digital detection signal. This processing corresponds to quantization processing. For example, the quantizer 340 compares the differential signal with a first threshold and a second threshold and supplies a comparison result to the transfer circuit 350 as a 2-bit detection signal. Note that the quantizer 340 is an example of a comparator.

The N-type transistors 361 and 362 can turn on and off power supplied to the current-voltage conversion circuit 310, the buffer 320, the subtractor 430, the quantizer 340, and the transfer circuit 350 in accordance with the enable signal. As these N-type transistors, for example, metal-oxide-semiconductor (MOS) transistors can be used. The N-type transistors 361 and 362 are connected in series between a power supply terminal and a power supply line 363, and enable signals ENx and ENy supplied from the signal processing circuit 230 are input to gates thereof. The power supply line 363 is connected to the respective power supply terminals of the current-voltage conversion circuit 310, the buffer 320, the subtractor 430, and the quantizer 340. Note that the N-type transistors 361 and 362 are examples of transistors.

Here, the enable signals ENx and ENy are signals indicating whether or not to enable an output of a pixel having the pixel address (x, y). For example, in a case where the output of the pixel is enabled, a high level is set to both the enable signals ENx and ENy. In addition, in the case where the output of the pixel is disabled, a low level is set to at least one of the enable signals ENx and ENy.

The transfer circuit 350 is configured to transfer the detection signal to the signal processing circuit 230 in accordance with the column drive signal from the column drive circuit 252.

Figure 7:
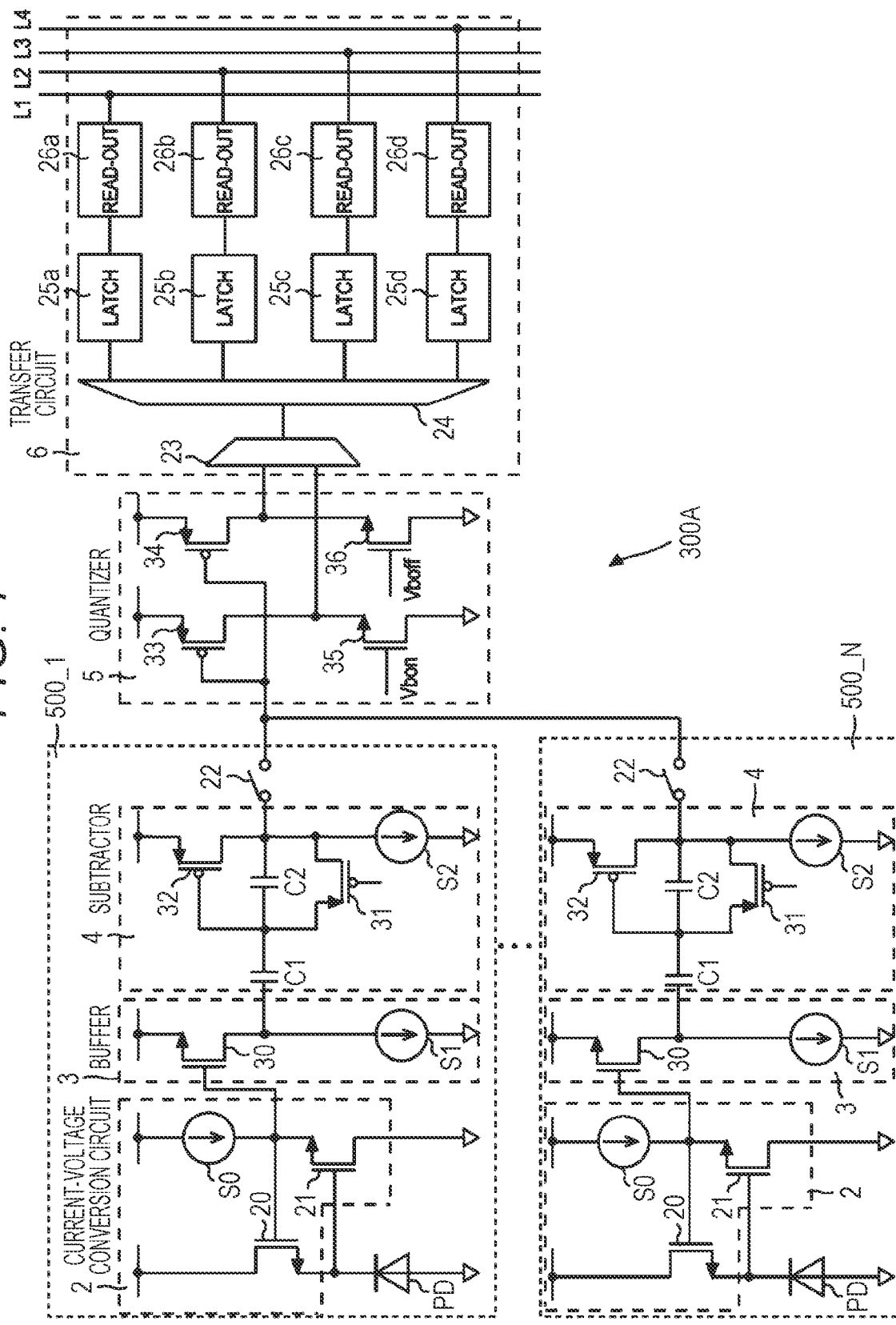
FIG. 7 is a circuit diagram illustrating an example of an address event circuit according to the present disclosure.

FIG. 7 is a circuit diagram illustrating an example of an address event detection circuit according to the present disclosure. Here, the address event circuit is an example of an imaging circuit. FIG. 7 illustrates in detail, parts corresponding to the photodiode 221, the current-voltage conversion circuit 310, the buffer 320, the subtractor 430, the quantizer 340, and the transfer circuit 350 in FIG. 6. However, unlike the circuit of FIG. 6, an address event detection circuit 300A of FIG. 7 includes a plurality of photodiodes PD. Furthermore, as illustrated in FIG. 7, in the imaging circuit according to the present disclosure, it is possible to adopt a configuration in which at least part of circuits at a stage subsequent to the photodiode PD is shared among the plurality of photodiodes PD.

The address event detection circuit 300A in FIG. 7 has N circuit blocks. Here, N is an arbitrary integer equal to or greater than 2. Each circuit block includes a photodiode PD, a current-voltage conversion circuit 2, a buffer 3, a subtractor 4, and a switch 22. Although a circuit block 500_1 and a circuit block 500_N are illustrated in FIG. 7, the number of circuit blocks may be larger than this.

An anode of the photodiode PD is connected to ground. As the ground, for example, a reference potential of the circuit or a reference potential of the substrate can be used. However, the type of the reference potential to be used as the ground is not limited.

The current-voltage conversion circuit 2 includes a transistor 20, a transistor 21, and a current source S0. As the transistor 20 and the transistor 21, for example, an NMOS transistor can be used. Furthermore, as the current source S0, for example, a PMOS transistor can be used.

A source of the transistor 20 is connected to a cathode of the photodiode PD. A drain of the transistor 20 is connected to a power supply potential. A gate of the transistor 20 is connected to the source of the transistor 21. Further, the current source S0 is connected between the power supply potential and a node between the gate of the transistor 20 and the source of the transistor 21. Furthermore, a gate of the transistor 21 is connected to the source of the transistor 20 and a cathode of the photodiode PD. A drain of the transistor 21 is connected to the ground.

The current-voltage conversion circuit 2 converts a current flowing through the photodiode PD into a logarithmic output voltage value. The current-voltage conversion circuit 2 in FIG. 7 is a source-grounded logarithmic conversion circuit, but this configuration is merely an example. Thus, a circuit having another configuration for converting a current into a voltage may be used. For example, as the current-voltage conversion circuit 2, a diode-type circuit, a gate-grounded circuit, or a gain boost (multistage) logarithmic conversion circuit may be used.

The buffer 3 includes a transistor 30 and a current source S1. As the transistor 30, for example, an NMOS transistor can be used. As the current source S1, for example, a PMOS transistor can be used. A source of the transistor 30 is connected to the power supply potential. A gate of the transistor 30 is connected to the current-voltage conversion circuit 2 (in a case of the example of FIG. 7, a node between the current source S0 and the source of the transistor 21). The current source S1 is connected between a drain of the transistor 30 and the ground.

As described above, the buffer 3 is a source follower circuit that performs impedance conversion. Use of the source follower circuit enables high input impedance and low output impedance to be maintained regardless of an amplitude of the voltage signal output from the current-voltage conversion circuit 2.

The subtractor 4 includes a capacitor C1, a capacitor C2, a transistor 31, a transistor 32, and a current source S2. As the transistor 31 and the transistor 32, for example, PMOS transistors can be used. As the current source S2, for example, an NMOS transistor can be used.

A source of the transistor 32 is connected to the power supply potential. The current source S2 is connected between a drain of the transistor 32 and the ground. In addition, the capacitor C1 and the capacitor C2 are connected in series between a node coupling the drain of the transistor 32 and the current source S2 and a node coupling a drain of the transistor 30 and the current source S1. A gate of the transistor 32 and a source of the transistor 31 are both connected to a node coupling the capacitor C1 and the capacitor C2. A drain of the transistor 31 is connected to a node coupling a drain of the transistor 32 and the current source S2.

The transistor 32 and the current source S2 form an inverter having a gate of the transistor 32 as an input side and a node coupling the drain of the transistor 32 and the current source S2 as an output side. The inverter is configured to invert an input voltage and output the inverted input voltage. The capacitor C2 is connected in parallel to the inverter. A gate voltage of the transistor 31 is controlled by a row drive signal. Thus, the source and the drain of the transistor 31 are turned on and off in accordance with the row drive signal.

When the voltage signal $V_{init}$ is input to the buffer 3 side (input side) of the capacitor C1 when the source/drain of the transistor 31 becomes conductive, an opposite side of the capacitor C1 becomes a virtual ground terminal. In a case where a potential of the virtual ground terminal is assumed to be zero, a potential $Q_{init}$ stored in the capacitor C1 is expressed by the following formula (1), where capacitance of the capacitor C1 is c1.

[Math. 1]

$$Q_{init} = c1 \times V_{init} \quad (1)$$

On the other hand, both ends of the capacitor C2 are short-circuited in this event, and thus, the stored charge of the capacitor C2 becomes substantially zero.

Next, operation when the source/drain of the transistor 31 is in a non-conductive state will be described. In this case, a case where the voltage on the buffer 3 side (input side) of the capacitor C1 changes to $V_{after}$ will be considered. In this case, a charge $Q_{after}$ stored in the capacitor C1 is expressed by the following formula (2).

[Math. 2]

$$Q_{after} = c1 \times V_{after} \quad (2)$$

On the other hand, a charge Q2 stored in the capacitor C2 in this event is expressed by the following formula (3), where an output voltage is Vout and electrostatic capacitance of the capacitor C2 is c2.

[Math. 3]

$$Q2 = -c2 \times V_{out} \quad (3)$$

A total charge amount of the capacitor C1 and the capacitor C2 does not change regardless of the conduction state between the source and the drain of the transistor 31, and thus, the following formula (4) holds.

[Math. 4]

$$Q_{init} = Q_{after} + Q2 \quad (4)$$

If the formulas (1) to (3) are substituted into the formula (4), the following formula (5) can be obtained.

[Math. 5]

$$V_{out} = -\frac{c1}{c2} \times (V_{after} - V_{init}) \quad (5)$$

Formula (5) represents subtraction operation of the voltage signal. The gain of the subtraction operation is c1/c2. In order to maximize the gain, a design can be made such that a value of c1 becomes greater and a value of c2 becomes smaller. However, if the value of c2 is set too small, kTC noise increases, and there is a possibility of affecting characteristics. It is therefore necessary to make a design in consideration of trade-off between the gain and noise. Note that the address event detection circuit 300 including the subtractor 4 is mounted for each pixel, and thus, the capacitor C1 and the capacitor C2 have area restrictions.

A switch 22 is provided between the output side of each subtractor 4 and the input side of the quantizer 5. During operation of the address event detection circuit 300A, the switch 22 corresponding to the circuit block to be read can be turned on, and the switch 22 corresponding to the circuit block not to be read can be turned off.

The quantizer 5 includes transistors 33 to 36. As the transistor 33 and the transistor 34, for example, PMOS transistors can be used. Furthermore, for example, NMOS transistors can be used as the transistor 35 and the transistor 36.

A source of the transistor 33 is connected to the power supply potential. A drain of the transistor 33 is connected to a source of the transistor 35. A drain of the transistor 35 is connected to the ground. A source of the transistor 34 is connected to the power supply potential. A drain of the transistor 34 is connected to a source of the transistor 36. A drain of the transistor 36 is connected to the ground. An input terminal of the quantizer 5 is connected to a gate of the transistor 33 and a gate of the transistor 34.

A bias voltage Vbon is applied to a gate of the transistor 35. On the other hand, a bias voltage Vboff is applied to a gate of the transistor 36. Here, the bias voltage Vbon corresponds to a first threshold, and the bias voltage Vboff corresponds to a second threshold. In addition, one output terminal of the quantizer 5 is connected to a node coupling the drain of the transistor 33 and the source of the transistor 35. A voltage of the output terminal corresponds to an ON event detection signal VCH. The other output terminal of the quantizer 5 is connected to a node coupling the drain of the transistor 34 and the source of the transistor 36. A voltage of the output terminal corresponds to an OFF event detection signal VCL.

In other words, the quantizer 5 is configured to output a high-level ON event detection signal VCH in a case where the differential signal exceeds the first threshold and output a low-level OFF event detection signal VCL in a case where the differential signal falls below the second threshold. Note that the number of quantizers 5 may be one. In this case, the quantizer 5 may be configured to output the ON event detection signal VCH and the OFF event detection signal VCL in time series.

The transfer circuit 6 includes a multiplexer 23, a demultiplexer 24, latch circuits 25a to 25d, and read circuits 26a to 26d. For example, each of the read circuits 26a to 26d is a circuit including a selection transistor. Two output terminals of the quantizer 5 are connected to corresponding input terminals of the multiplexer 23. An output terminal of the multiplexer 23 is connected to an input terminal of the demultiplexer 24. The demultiplexer 24 includes a plurality of output terminals. A latch circuit and a read circuit are connected in series to a subsequent stage of each output terminal of the demultiplexer 24. The output side of each read circuit is connected to one of the read lines (L1 to L4).

The multiplexer 23 can supply a signal input to one of the input terminals to the demultiplexer 24 at a subsequent stage, for example, in accordance with a first control signal (not illustrated). Furthermore, the demultiplexer 24 can output a signal supplied to the input terminal from one of the output terminals, for example, in accordance with a second control signal (not illustrated). Here, the first control signal and the second control signal may be a common signal or different signals. As the first control signal and the second control signal, for example, a clock signal or a timing signal generated by a control circuit or a clock generator (neither is illustrated) can be used. However, types of the first control signal and the second control signal are not limited.

As described above, the imaging circuit according to the present disclosure may include a plurality of circuit blocks, a quantizer, a demultiplexer, and a plurality of latch circuits. The plurality of circuit blocks includes a photoelectric conversion element that photoelectrically converts incident light to generate a photocurrent, and a current-voltage conversion circuit that converts the photocurrent into a voltage signal. The photodiode PD is an example of a photoelectric conversion element. The quantizer generates a detection signal of an address event in accordance with a result of comparing a voltage signal supplied from at least one of the plurality of circuit blocks with a threshold. The demultiplexer is connected to a subsequent stage of the quantizer. The plurality of latch circuits is connected to different output terminals of the demultiplexer. Each of the plurality of latch circuits may be configured to store an address event detected by the quantizer.

Each of the plurality of circuit blocks may include a buffer circuit that performs impedance conversion, and a subtractor that converts the voltage signal into a differential voltage. The quantizer may be configured to detect an ON event in a case where a voltage signal supplied from at least one of the plurality of circuit blocks exceeds the first threshold voltage. The quantizer may be configured to detect an OFF event in a case where a voltage signal supplied from at least one of the plurality of circuit blocks falls below the second threshold voltage.

The transfer circuit 6 of FIG. 7 includes M latch circuits each connected to the corresponding output terminal of the demultiplexer 24. A design can be made such that the number M of latch circuits is, for example, equal to or larger than 2 and equal to or smaller than 2×N (twice the number N of photodiodes PD). This can prevent the address event detection circuit from becoming complicated and prevent increase in a mounting area. However, the number M of latch circuits is not limited.

As described above, the number of latch circuits may be equal to or larger than two and equal to or smaller than twice the number of photoelectric conversion elements. As in the example of FIG. 7, the plurality of photoelectric conversion elements may be arranged in a direction substantially parallel to the read lines. However, the direction in which the plurality of photoelectric conversion elements is arranged is not limited.

Figure 8:
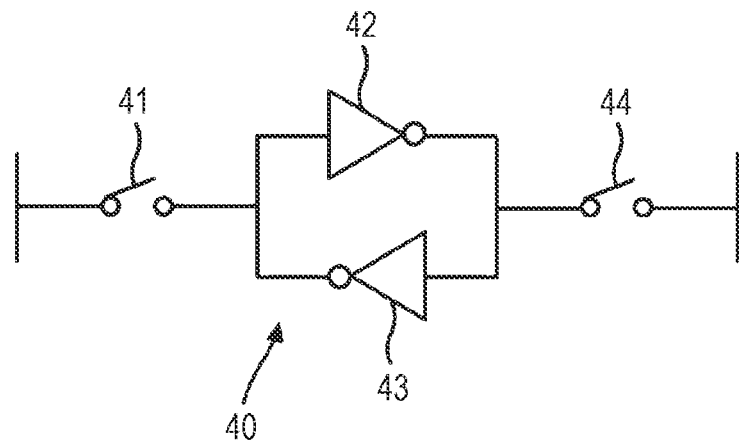
FIG. 8 is a circuit diagram illustrating an example of a latch circuit.

FIG. 8 illustrates an example of a latch circuit that can be implemented in the address event detection circuit. For example, the latch circuit 40 in FIG. 8 can be used as the latch circuits 25a to 25d. The latch circuit 40 includes a switch 41, an inverter 42, an inverter 43, and a switch 44. An output side of the inverter 42 is connected to an input side of the inverter 43. An input side of the inverter 42 is connected to an output side of the inverter 43. The switch 41 is connected between an input terminal of the latch circuit 40 and a node coupling the input side of the inverter 42 and the output side of the inverter 43. In addition, the switch 44 is connected between a node coupling the output side of the inverter 42 and the input side of the inverter 43, and an output terminal of the latch circuit 40.

The latch circuit 40 holds a voltage level of the input terminal when the switch 41 is in an ON state and the switch 44 is in an OFF state. The latch circuit 40 outputs the held voltage level from the output terminal when the switch 41 is in an OFF state and the switch 44 is in an ON state.

The circuit of FIG. 8 is merely an example of the latch circuit. Thus, a latch circuit having a different configuration may be used.

Next, a connection relationship of the number of the latch circuits 25 in the address event detection circuit including the plurality of photodiodes PD will be described.

Figure 9:
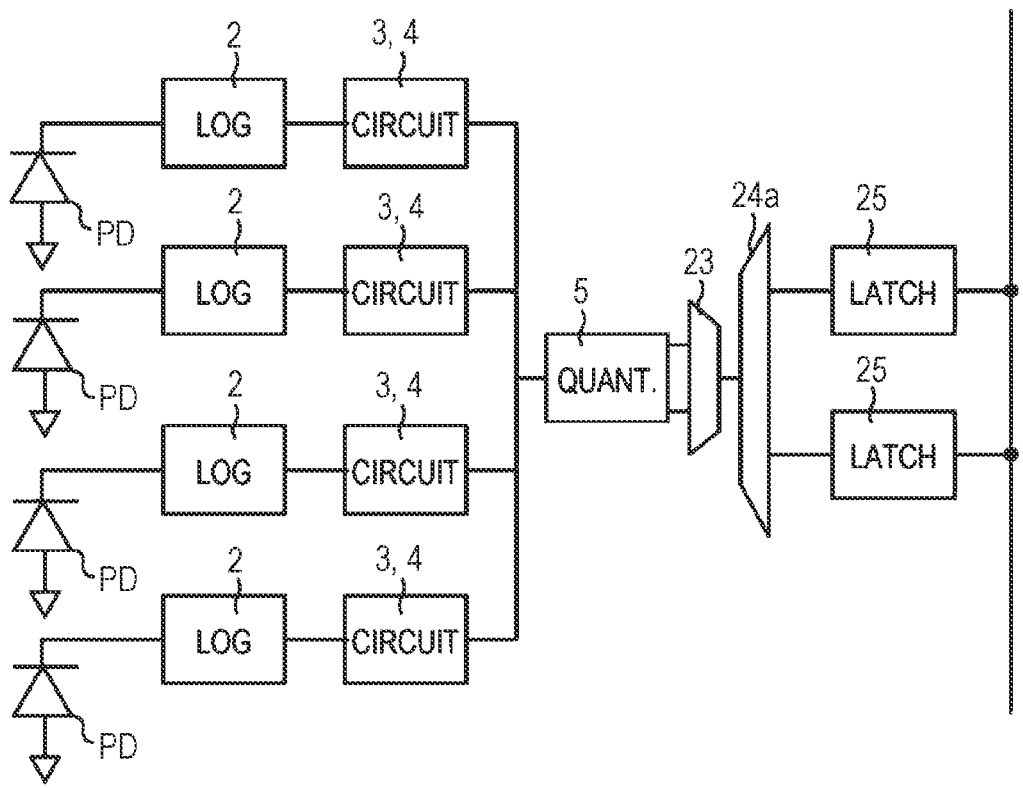
FIG. 9 is a view illustrating an example of an address event circuit having latch circuits of the number equal to half of the number of photodiodes.

The address event detection circuit in FIG. 9 includes four photodiodes PD. In addition, corresponding current-voltage conversion circuit 2, buffer 3, and subtractor 4 are sequentially connected to a subsequent stage of each photodiode PD. On the other hand, the address event detection circuit of FIG. 9 includes one quantizer 5. Thus, detection signals output from the respective subtractors 4 are input to the common quantizer 5. In addition, a multiplexer 23 and a demultiplexer 24a are sequentially connected to a subsequent stage of the quantizer 5. The latch circuit 25 is connected to each of two output terminals of the demultiplexer 24a. Further, a read line is connected to a subsequent stage of each of the latch circuits 25.

In a similar manner to the example of FIG. 7, the multiplexer 23 may be controlled by the first control signal. Furthermore, the demultiplexer 24a may be controlled by the second control signal. Note that, in the following drawings, a read circuit between the latch circuit 25 and the read line will be omitted for simplification of description.

In the address event detection circuit of FIG. 9, for example, an ON event and an OFF event in any photodiodes PD can be simultaneously held by using the two latch circuits 25. However, it is necessary to perform sequential reading to acquire the ON event and the OFF event for all the four photodiodes PD, which makes time required for reading longer.

Figure 10:
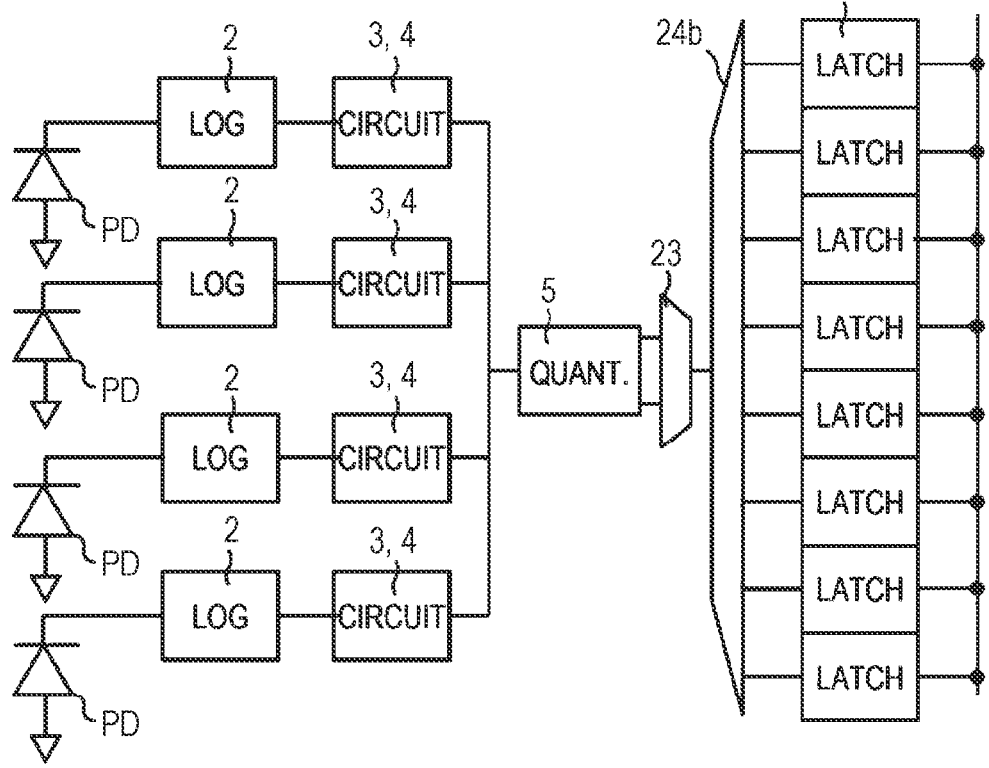
FIG. 10 is a view illustrating an example of an address event circuit having latch circuits of the number equal to twice the number of photodiodes.

The address event detection circuit of FIG. 10 also includes four photodiodes PD. The corresponding current-voltage conversion circuit 2, buffer 3, and subtractor 4 are sequentially connected to a subsequent stage of each photodiode PD. On the other hand, the address event detection circuit of FIG. 10 includes one quantizer 5. Thus, detection signals output from the respective subtractors 4 are input to the common quantizer 5. The multiplexer 23 and the demultiplexer 24b are sequentially connected to a subsequent stage of the quantizer 5. The latch circuit 25 is connected to each of the eight output terminals of the demultiplexer 24b. Further, a read line is connected to a subsequent stage of each of the latch circuits 25.

In a similar manner to the example of FIG. 7, the multiplexer 23 may be controlled by the first control signal. Furthermore, the demultiplexer 24b may be controlled by the second control signal.

The address event detection circuit in FIG. 10 includes the latch circuits 25 of the number that is twice the number of photodiodes PD. It is therefore possible to simultaneously hold ON events and OFF events in all the photodiodes PD. However, this configuration increases the number of latch circuits 25 and increases the mounting area.

Figure 11:
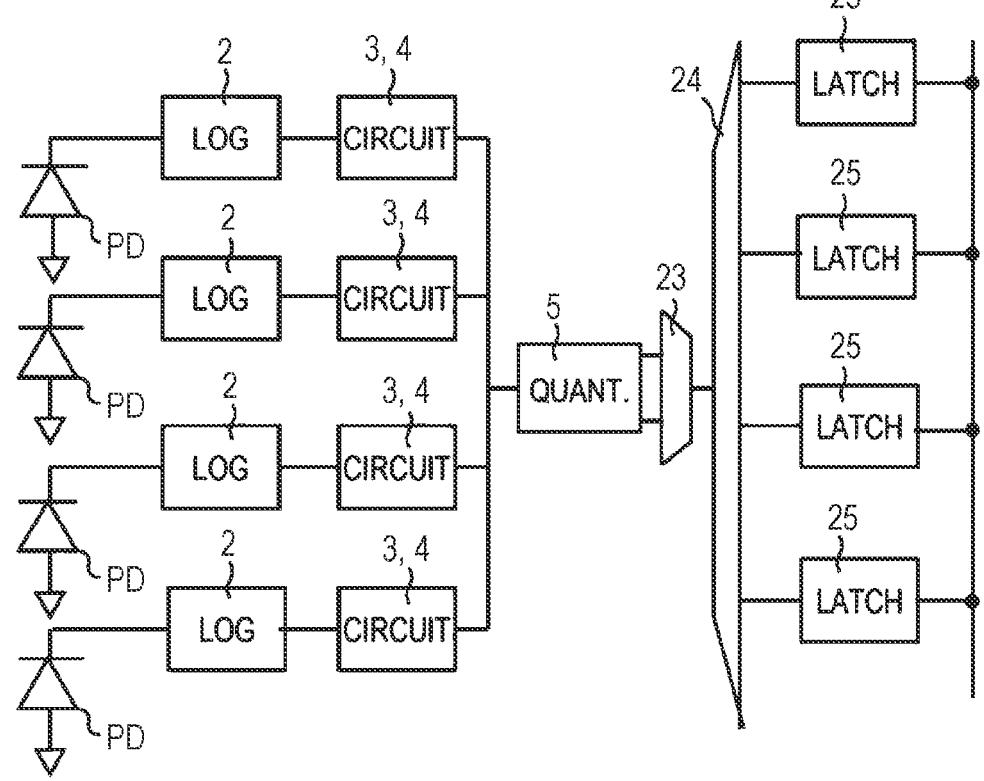
FIG. 11 is a view illustrating an example of an address event circuit having latch circuits of the number equal to the number of photodiodes.

The address event detection circuit of FIG. 11 also includes four photodiodes PD. The corresponding current-voltage conversion circuit 2, buffer 3, and subtractor 4 are sequentially connected to a subsequent stage of each photodiode PD. On the other hand, the address event detection circuit of FIG. 11 includes one quantizer 5.

Thus, detection signals output from the respective subtractors 4 are input to the common quantizer 5. The multiplexer 23 and the demultiplexer 24 are sequentially connected to a subsequent stage of the quantizer 5. The latch circuit 25 is connected to each of the four output terminals of the demultiplexer 24. Further, a read line is connected to a subsequent stage of each of the latch circuits 25.

In a similar manner to the example of FIG. 7, the multiplexer 23 may be controlled by the first control signal. Furthermore, the demultiplexer 24 may be controlled by the second control signal.

As described above, the number M of latch circuits may be equal to or larger than two and equal to or smaller than 2×N (twice the number N of photodiodes PD). In a case of the address event detection circuit of FIG. 11, after the ON events are read for the four photodiodes PD, the OFF events can be read for the four photodiodes PD. In addition, two latch circuits may be used to hold an ON event and an OFF event of one of the photodiodes PD, and the remaining two latch circuits may be used to hold ON events and OFF events of the other photodiodes PD. By performing such pipeline operation, it is possible to expand the function of the address event detection circuit while reducing the number of latch circuits.

Figure 12:
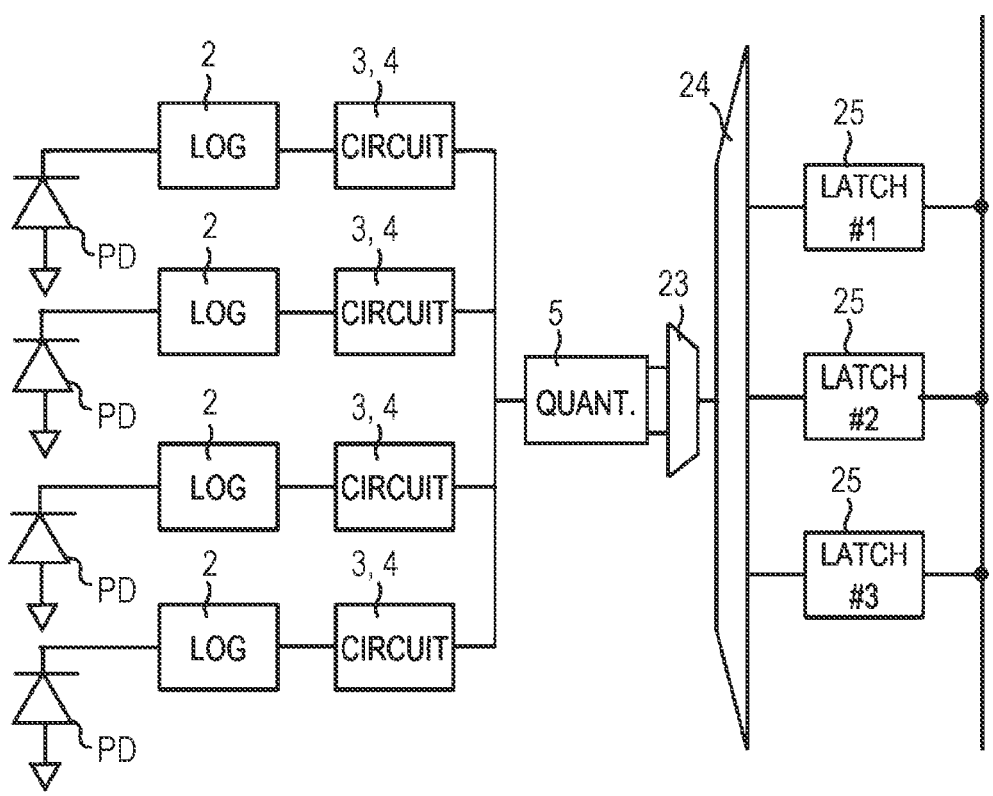
FIG. 12 is a view illustrating an example of an address event circuit having three latch circuits.

The address event detection circuit in FIG. 12 corresponds to the address event detection circuit in FIG. 11 in which the number of the latch circuits 25 at the subsequent stage of the demultiplexer 24 is made 3. In a case where the address event detection circuit of FIG. 12 is used, each latch circuit may be caused to execute processing related to any one of the three steps in a specified order. For example, at a certain timing, a latch circuit #1 may be caused to execute read processing, a latch circuit #2 may be caused to execute comparison operation (holding processing), and a latch #3 may be caused to execute reset processing. In this case, the latch circuit #1 can execute reset processing, the latch circuit #2 can execute read processing, and the latch circuit #3 can execute comparison operation (holding processing) at the next timing. By performing such pipeline operation, it is possible to efficiently read events.

Figure 13:
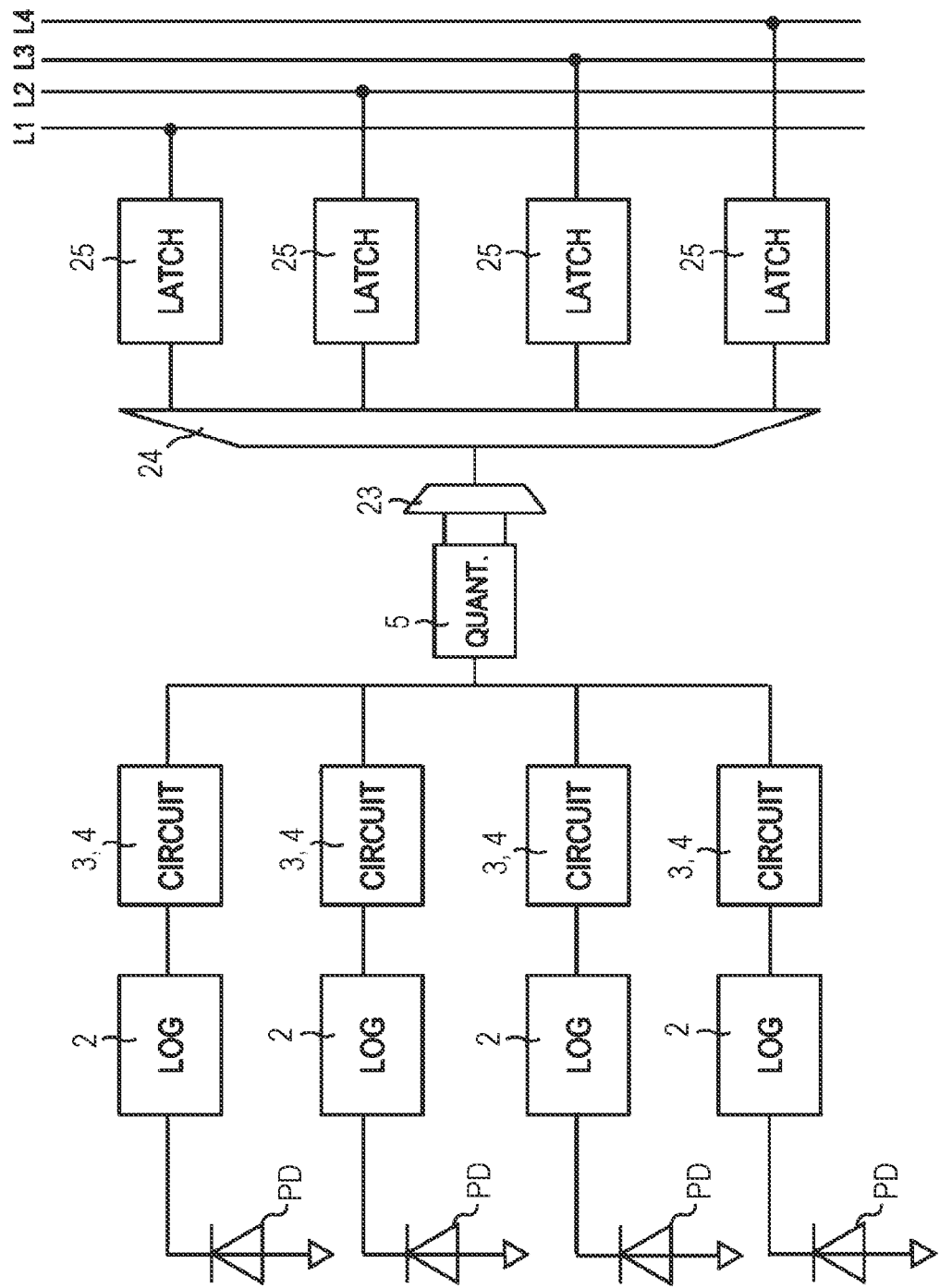
FIG. 13 is a view illustrating an example of an address event circuit connected to four read lines.

In a similar manner to the address event detection circuit of FIG. 11, the address event detection circuit of FIG. 13 includes four photodiodes PD and four latch circuits 25. However, unlike the example of FIG. 11, the subsequent stages of the latch circuits 25 are connected to different read lines (L1 to L4). As described above, the latch circuit 25 may employ a configuration in which the read lines at the subsequent stage are different. As a result, content held by the plurality of latch circuits 25 can be read in parallel, so that higher speed operation can be achieved. In a case where the configuration of FIG. 13 is adopted, the latch circuit 25 of another address event detection circuit (not illustrated) may be further connected to each of the read lines (L1 to L4). In other words, the read lines L1 to L4 may be shared by a plurality of address event detection circuits. By adopting the configuration as illustrated in FIG. 13, it is possible to reduce the number of line memories required for rearranging data.

Figure 14:
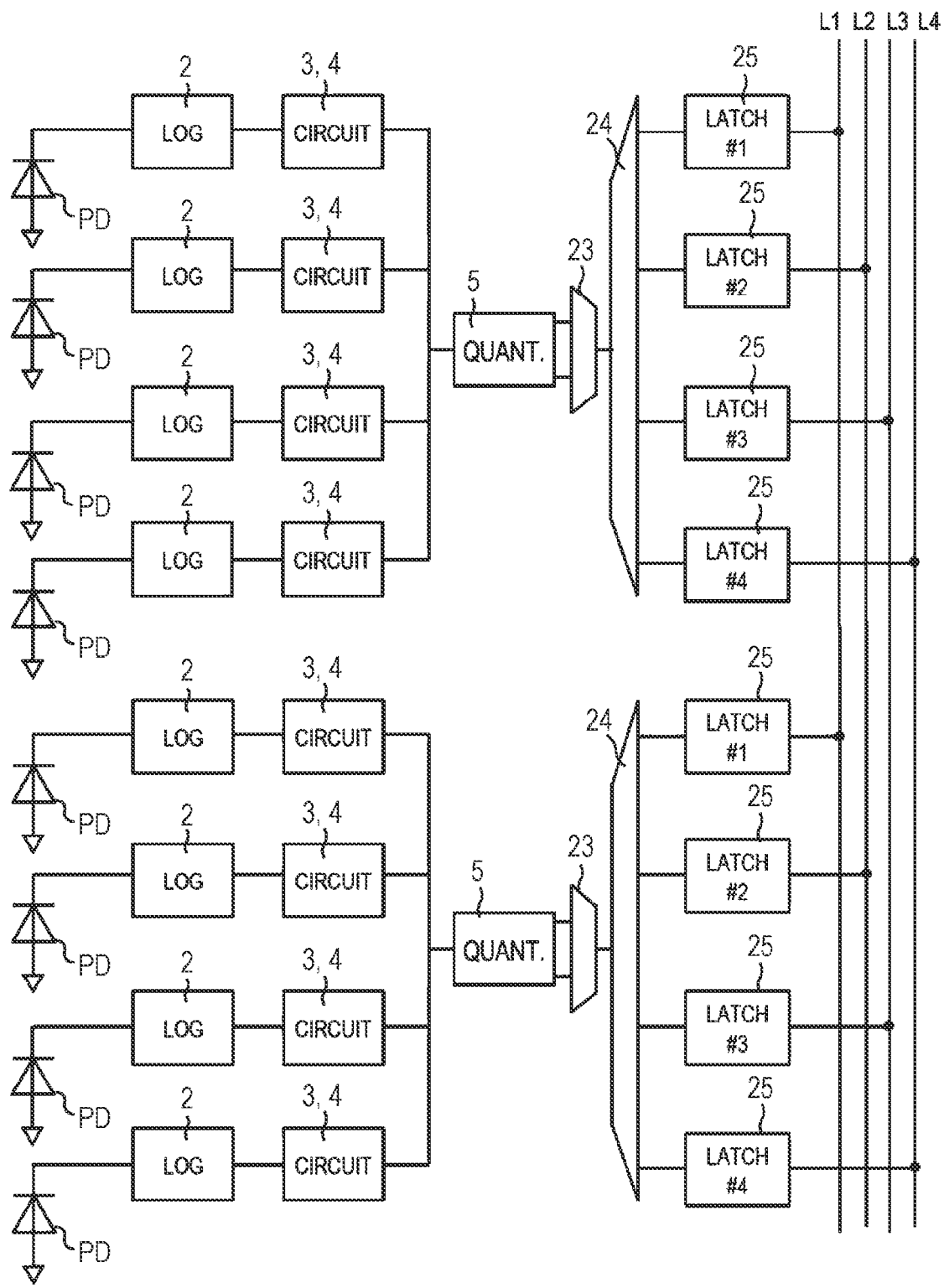
FIG. 14 is a view illustrating an example of a plurality of address event circuits connected to four read lines.

FIG. 14 illustrates an example in which output sides of a plurality of address event circuits are connected to a common read line. In the example of FIG. 14, corresponding latch circuits in a plurality of address event circuits are connected to the same read line. In other words, the latch circuit #1 is connected to the read line L1. The latch circuit #2 is connected to the read line L2. The latch circuit #3 is connected to the read line L3. The latch circuit #4 is connected to the read line L4. For example, in the circuit of FIG. 14, content of the latch circuit 25 can be read for each address event circuit. In this case, the content simultaneously output from the read lines L1 to L4 is events read from the same address event circuit, so that rearrangement of data in the subsequent circuits is facilitated.

Figure 15:
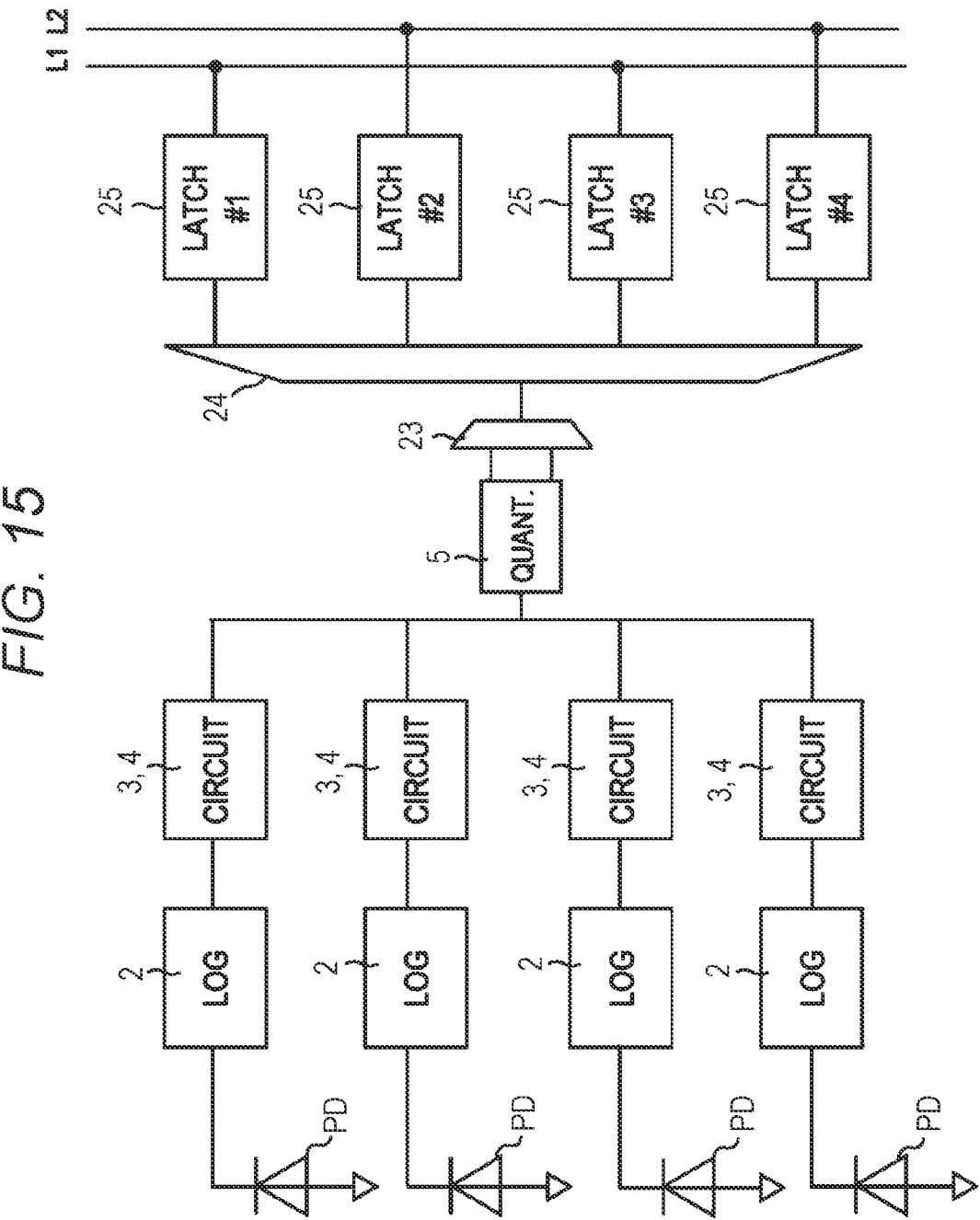
FIG. 15 is a view illustrating an example of an address event circuit connected to two read lines.

In the address event circuit of FIG. 15, the number of read lines connected to the subsequent stage is two. As described above, the number of read lines connected to the subsequent stage of the address event circuit may not necessarily be equal to the number M of latch circuits included in the address event circuit. For example, the number of read lines connected to the subsequent stage of the address event circuit can be set to a value obtained by dividing the number M of latch circuits included in the address event circuit by a positive integer. In FIG. 15, a value 2 obtained by dividing M=4 by 2 is the number of read lines. However, the number of read lines connected to the subsequent stage of the address event circuit does not necessarily satisfy this rule. If this rule is not satisfied, a plurality of address event circuits can be read at the same time.

In the address event circuit of FIG. 15, the latch #1 and the latch #3 are connected to the read line L1. Further, the latch #2 and the latch #4 are connected to the read line L2.

Figure 16:
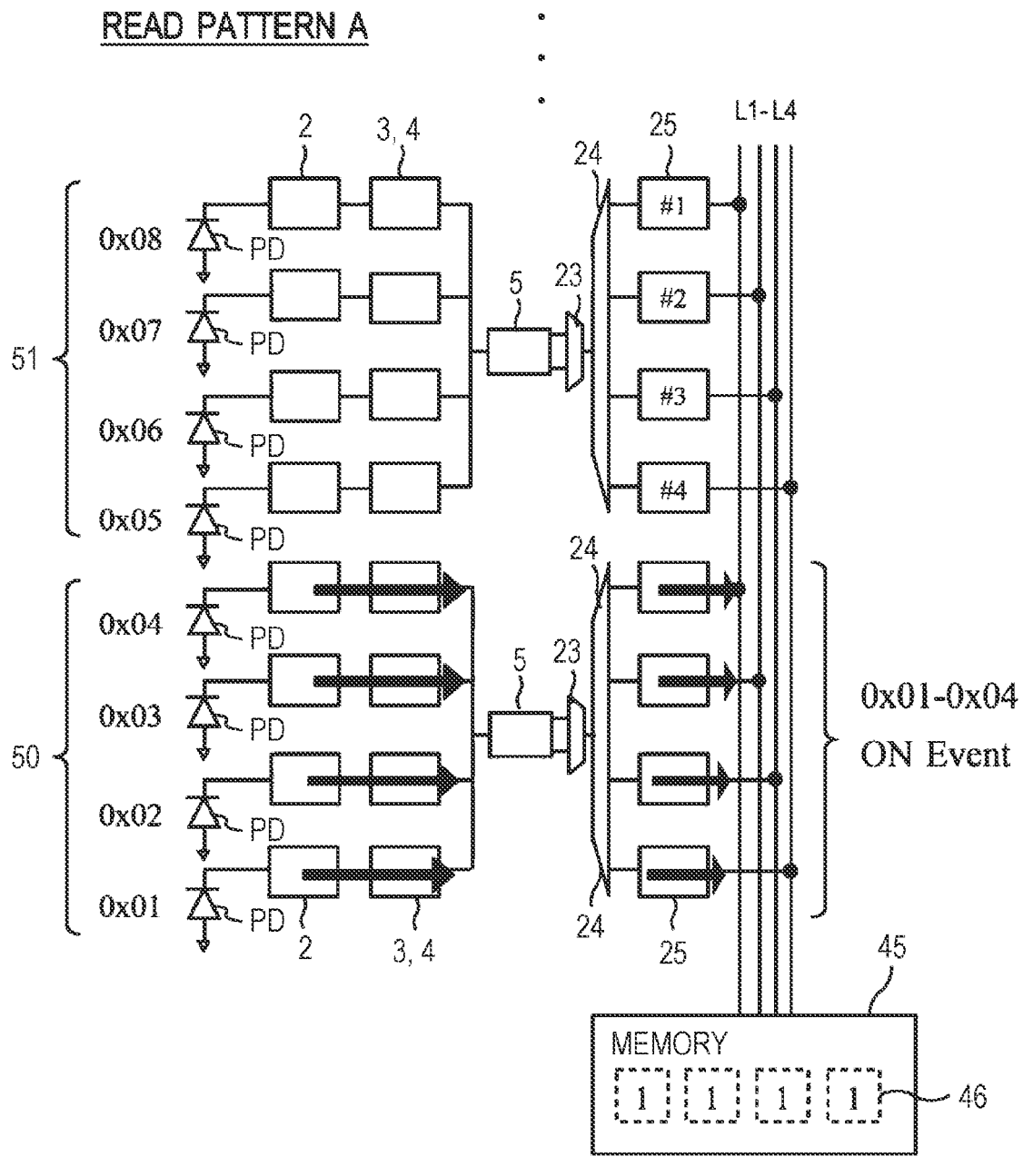
FIG. 16 is a view illustrating an example of a phase #N of a read pattern A.
Figure 17:
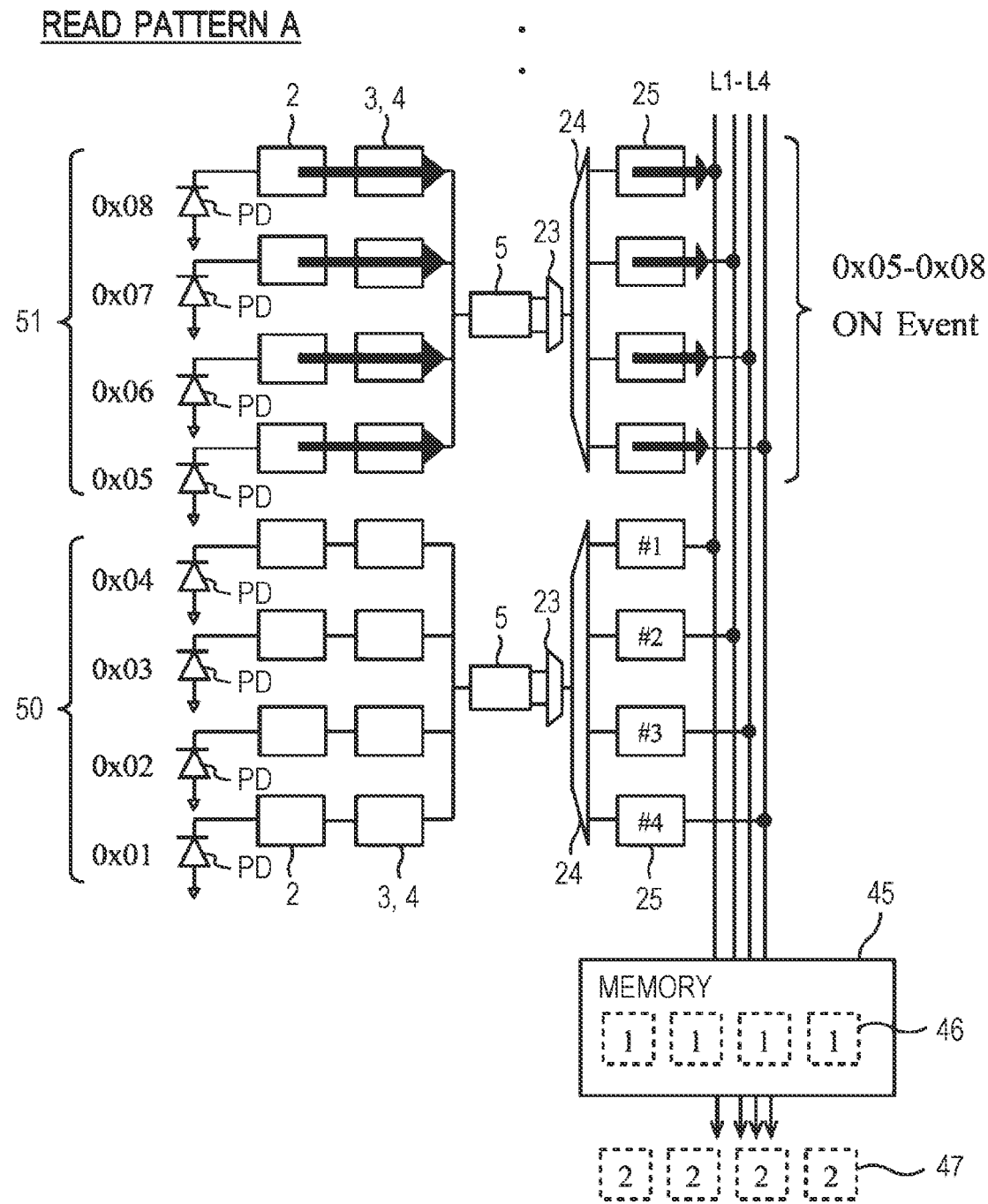
FIG. 17 is a view illustrating an example of a phase #(N+1) of the read pattern A.

FIGS. 16 and 17 illustrate examples of read patterns (READ PATTERN A) in the address event circuits 50 and 51 connected to the read lines L1 to L4. Addresses of 0x01 to 0x04 are assigned to the plurality of photodiodes PD of the address event circuit 50. On the other hand, addresses of 0x05 to 0x08 are assigned to the plurality of photodiodes PD of the address event circuit 51. In the address event circuits 50 and 51, the latch circuit #1 is connected to the read line L1. Further, in the address event circuits 50 and 51, the latch circuit #2 is connected to the read line L2. In a similar manner, the latch circuit #3 is connected to the read line L3, and the latch circuit #4 is connected to the read line L4.

As described above, the imaging device according to the present disclosure may include a storage unit and a plurality of imaging circuits. The above-described memory is an example of a storage unit. The plurality of latch circuits included in each imaging circuit may be connected to different read lines. Furthermore, the corresponding latch circuits of the plurality of imaging circuits may be connected to the same read line. A storage unit may be connected to a subsequent stage of the plurality of read lines.

FIG. 16 illustrates operation in phase #N. In the phase #N, ON events are read for the photodiodes PD at the addresses 0x01 to 0x04 of the address event circuit 50. The ON events read in the phase are stored in the memory 45 via the read lines L1 to L4. Each of four data fragments 46 in the memory 45 corresponds to the read ON event.

FIG. 17 illustrates operation in phase #(N+1) corresponding to the next phase of the phase in FIG. 16. In phase #(N+1), ON events are read for the photodiodes PD at addresses 0x05 to 0x08 of the address event circuit 51. The four data fragments 46 corresponding to the ON events read in the previous phase are transferred from the memory 45 to a circuit at a subsequent stage. Then, the ON events read in the phase are stored in the memory 45 via the read lines L1 to L4. Each of the four data fragments 47 in the memory 45 corresponds to the ON event read in the phase #(N+1).

In a case where the read pattern (READ PATTERN A) illustrated in FIGS. 16 and 17 is used, the memory 45 connected to the read lines L1 to L4 may be a buffer with four lines. While in the examples of FIGS. 16 and 17, a case where the ON events are read has been described as an example, the OFF events may be read using a similar method. As described above, the imaging device according to the present disclosure may be configured to transfer the address event stored in the latch circuit to the storage unit for each imaging circuit.

Figure 18:
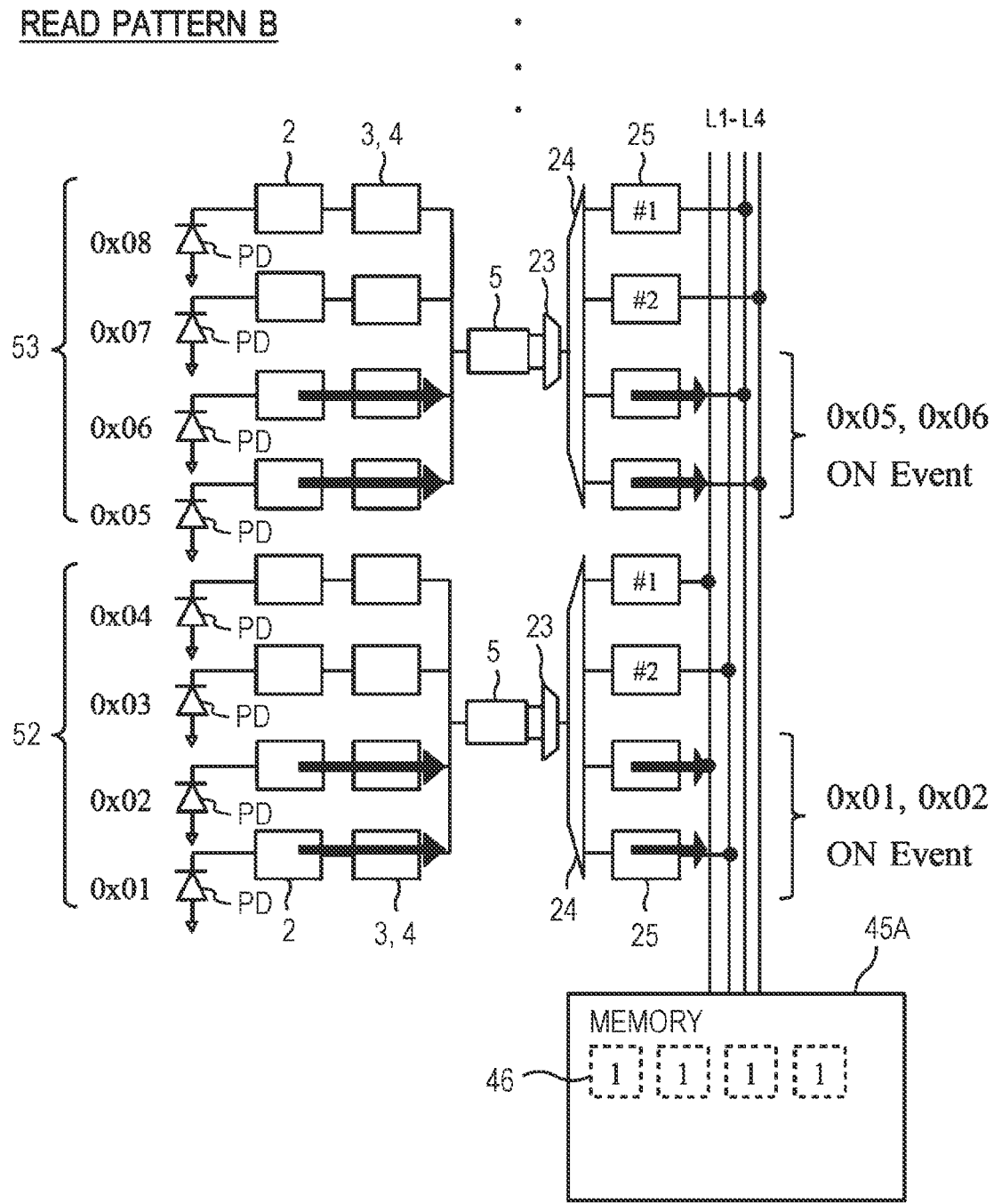
FIG. 18 is a view illustrating an example of a phase #N of a read pattern B.
Figure 19:
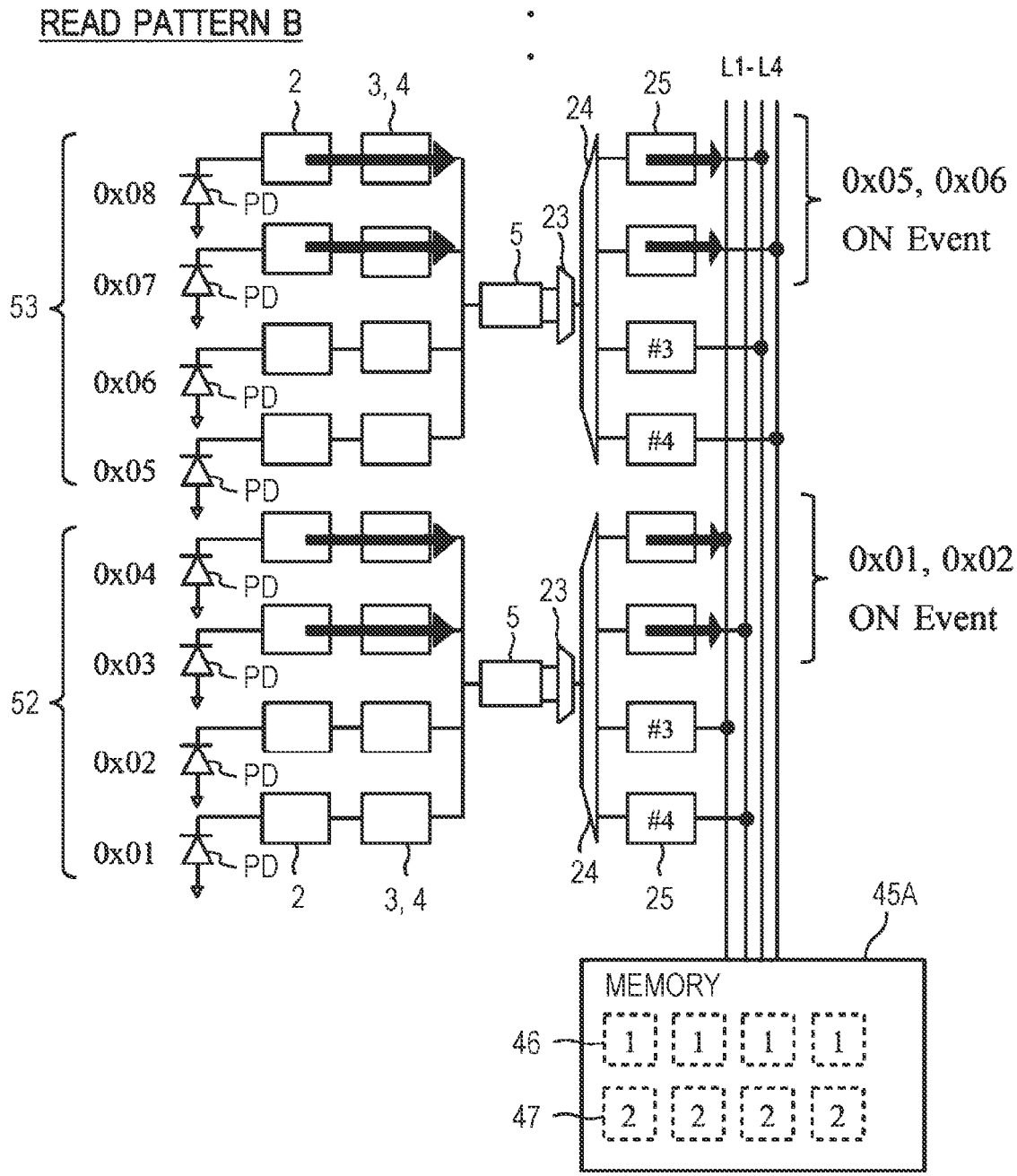
FIG. 19 is a view illustrating an example of a phase #(N+1) of the read pattern B.

FIGS. 18 and 19 illustrate examples of read patterns (READ PATTERN B) in the address event circuits 52 and 53 connected to the read lines L1 to L4. Addresses of 0x01 to 0x04 are assigned to the plurality of photodiodes PD of the address event circuit 52. On the other hand, addresses of 0x05 to 0x08 are assigned to the plurality of photodiodes PD of the address event circuit 53.

In the address event circuits 52 and 53, connection relationships with the read lines L1 to L4 are different from those of the address event circuits 50 and 51 described above. In other words, the latch circuit #1 and the latch circuit #3 of the address event circuit 52 are connected to the read line L1. On the other hand, the latch circuit #2 and the latch circuit #4 of the address event circuit 52 are connected to the read line L2. The latch circuit #1 and the latch circuit #3 of the address event circuit 53 are connected to the read line L3. The latch circuit #2 and the latch circuit #4 of the address event circuit 53 are connected to the read line L4.

As described above, the imaging device according to the present disclosure may include a storage unit and a plurality of imaging circuits. The plurality of latch circuits included in each imaging circuit may be connected to some of the plurality of read lines. Furthermore, the plurality of latch circuits included in each imaging circuit may be divided into groups each connected to the same read line. The read lines to which the plurality of latch circuits is connected may be different depending on the imaging circuits. A storage unit may be connected to a subsequent stage of the plurality of read lines.

FIG. 18 illustrates operation in phase #N. In the phase #N, ON events are read for the photodiodes PD at the addresses 0x01 and 0x02 of the address event circuit 52 and the addresses 0x05 and 0x06 of the address event circuit 53. The ON events read in the phase are stored in the memory 45A via the read lines L1 to L4. Each of the four data fragments 46 in the memory 45A corresponds to the read ON event.

FIG. 19 illustrates operation in phase #(N+1) corresponding to the next phase of the phase in FIG. 18. In the phase #(N+1), the ON events are read out for the photodiodes PD at the addresses 0x03 and 0x04 of the address event circuit 52 and the addresses 0x07 and 0x08 of the address event circuit 53. The ON events read in the phase are stored in the memory 45A via the read lines L1 to L4. Each of the four data fragments 47 in the memory 45A corresponds to the ON event read in the phase #(N+1).

In a case where the read pattern (READ PATTERN B) illustrated in FIGS. 18 and 19 is used, reading of events in one address event circuit is completed in a plurality of phases. It is therefore necessary to use a buffer with eight lines as the memory 45A connected to the read lines L1 to L4. While in the examples of FIGS. 18 and 19, a case where the ON events are read has been described as an example, the OFF events may be read using a similar method. As described above, the imaging circuit according to the present disclosure may be configured such that a plurality of address event circuits is simultaneously read. Furthermore, the imaging device according to the present disclosure may be configured to read the address event stored in any one of the latch circuits belonging to the group among the plurality of imaging circuits and transfer the address event to the storage unit.

Figure 20:
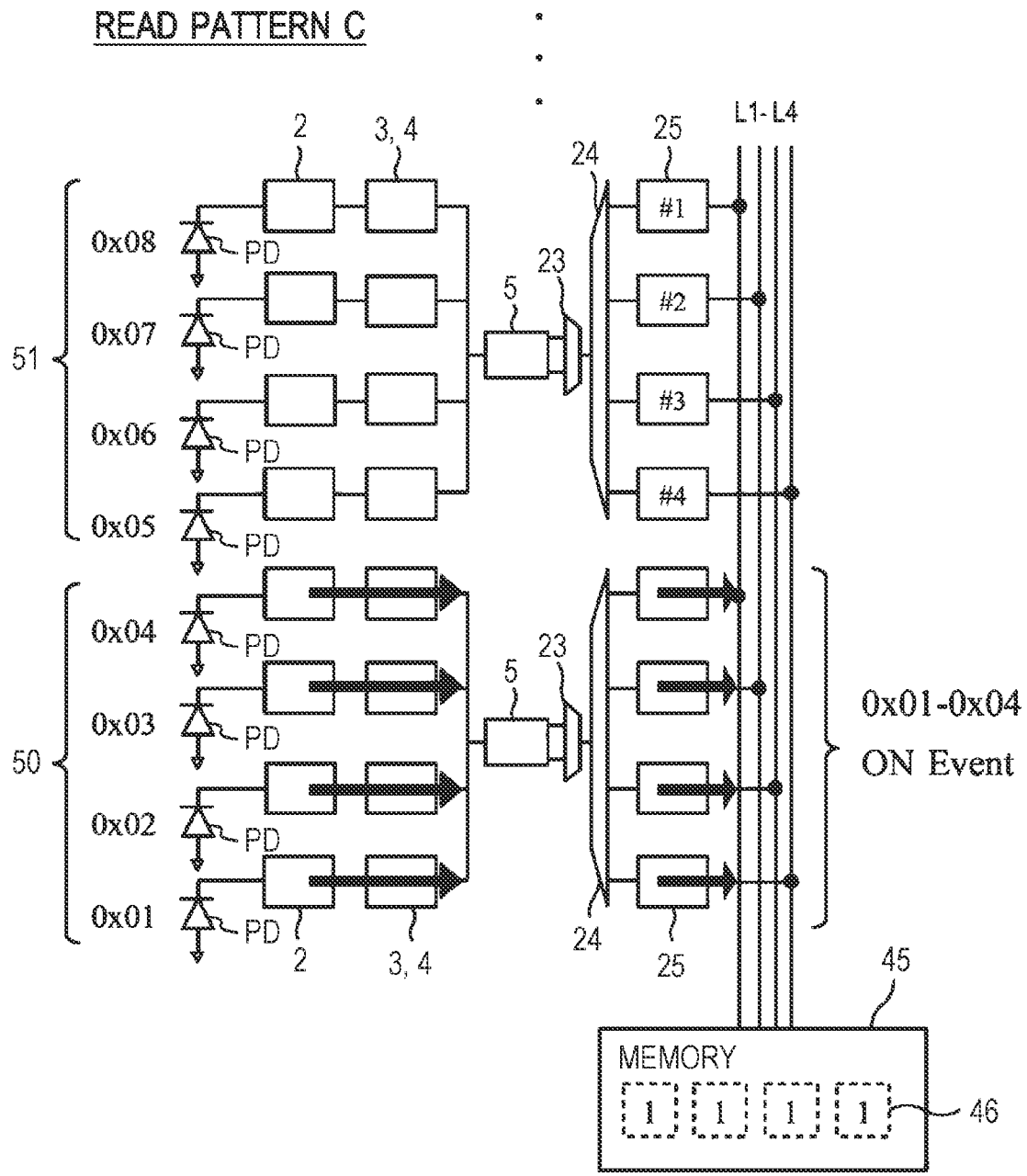
FIG. 20 is a view illustrating an example of a phase #N of a read pattern C.
Figure 21:
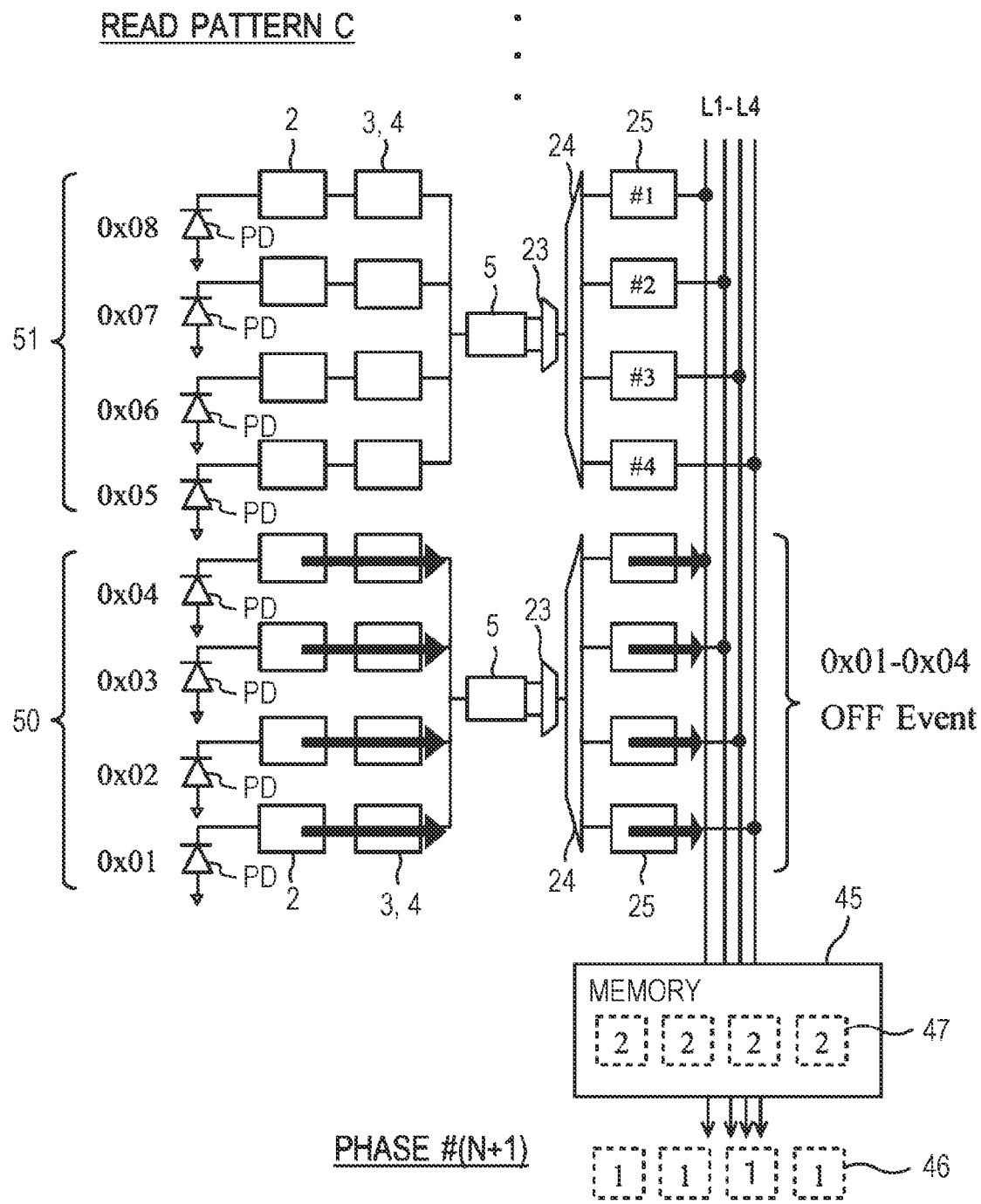
FIG. 21 is a view illustrating an example of a phase #(N+1) of the read pattern C.

FIGS. 20 and 21 illustrate examples of read patterns (READ PATTERN C) in the address event circuits 50 and 51 connected to the read lines L1 to L4. Address assignment and connection relationships with the read lines L1 to L4 in the examples of FIGS. 20 and 21 are similar to those in the examples of FIGS. 16 and 17 described above.

FIG. 20 illustrates operation in phase #N. In the phase #N, ON events are read for the photodiodes PD at the addresses 0x01 to 0x04 of the address event circuit 50. The ON events read in the phase are stored in the memory 45 via the read lines L1 to L4. Each of the four data fragments 46 in the memory 45 corresponds to the ON event read in the phase #N.

FIG. 21 illustrates operation in phase #(N+1) corresponding to the next phase of the phase in FIG. 20. In phase #(N+1), OFF events are read for the photodiodes PD at addresses 0x01 to 0x04 of the address event circuit 50. The four data fragments 46 corresponding to the ON events read in the previous phase are transferred from the memory 45 to a circuit at a subsequent stage. Then, the OFF events read in the phase are stored in the memory 45 via the read lines L1 to L4. Each of the four data fragments 47 in the memory 45 corresponds to the OFF event read in the phase #(N+1).

As illustrated in the read pattern (READ PATTERN C) of FIGS. 20 and 21, the ON events may be alternately read for each address event circuit. Further, for each address event circuit, the OFF events may be alternately read. As described above, the imaging device according to the present disclosure may be configured such that the ON event or the OFF event stored in the latch circuit is alternately read and transferred to the storage unit for each imaging circuit.

Figure 22:
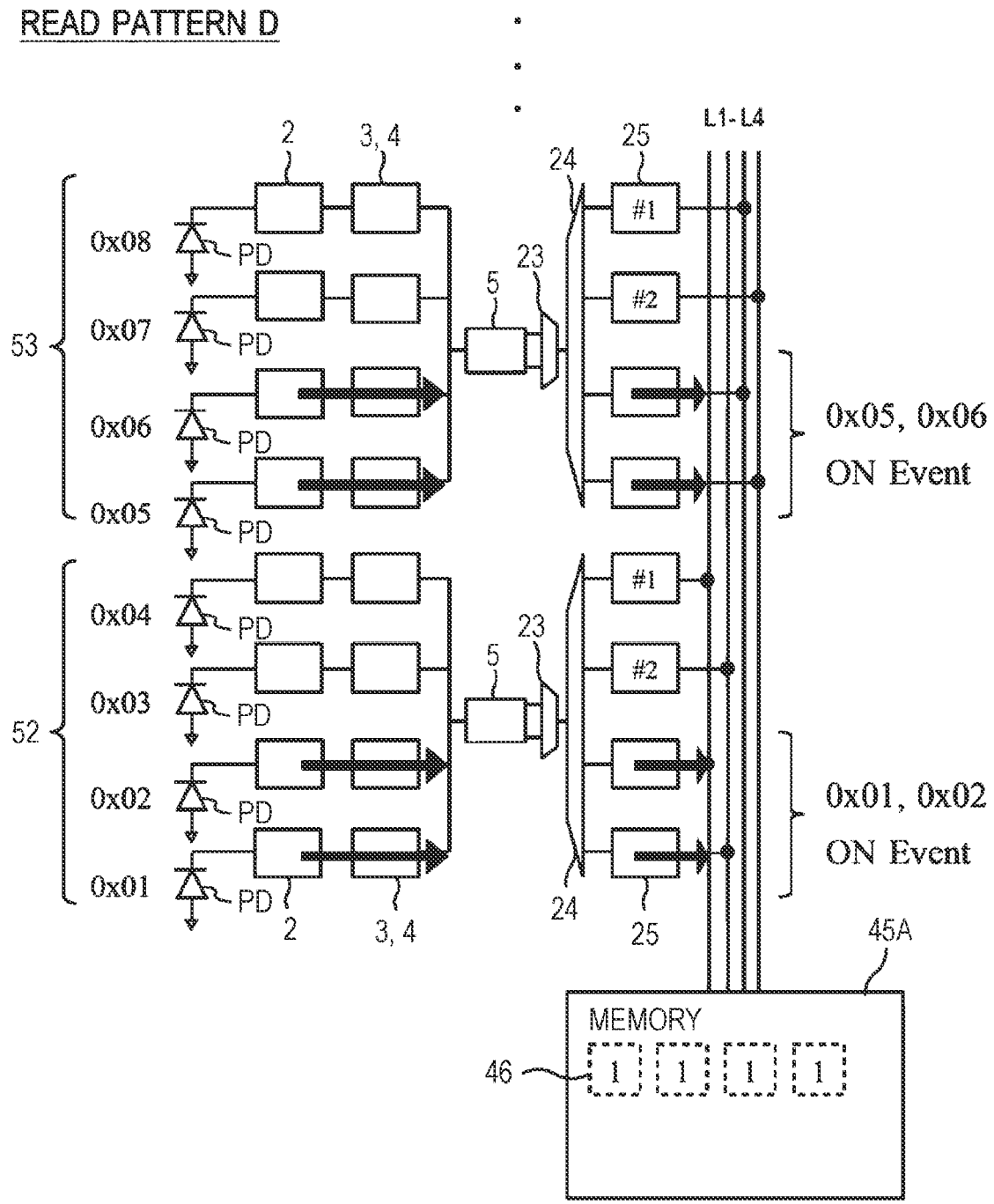
FIG. 22 is a view illustrating an example of a phase #N of a read pattern D.
Figure 23:
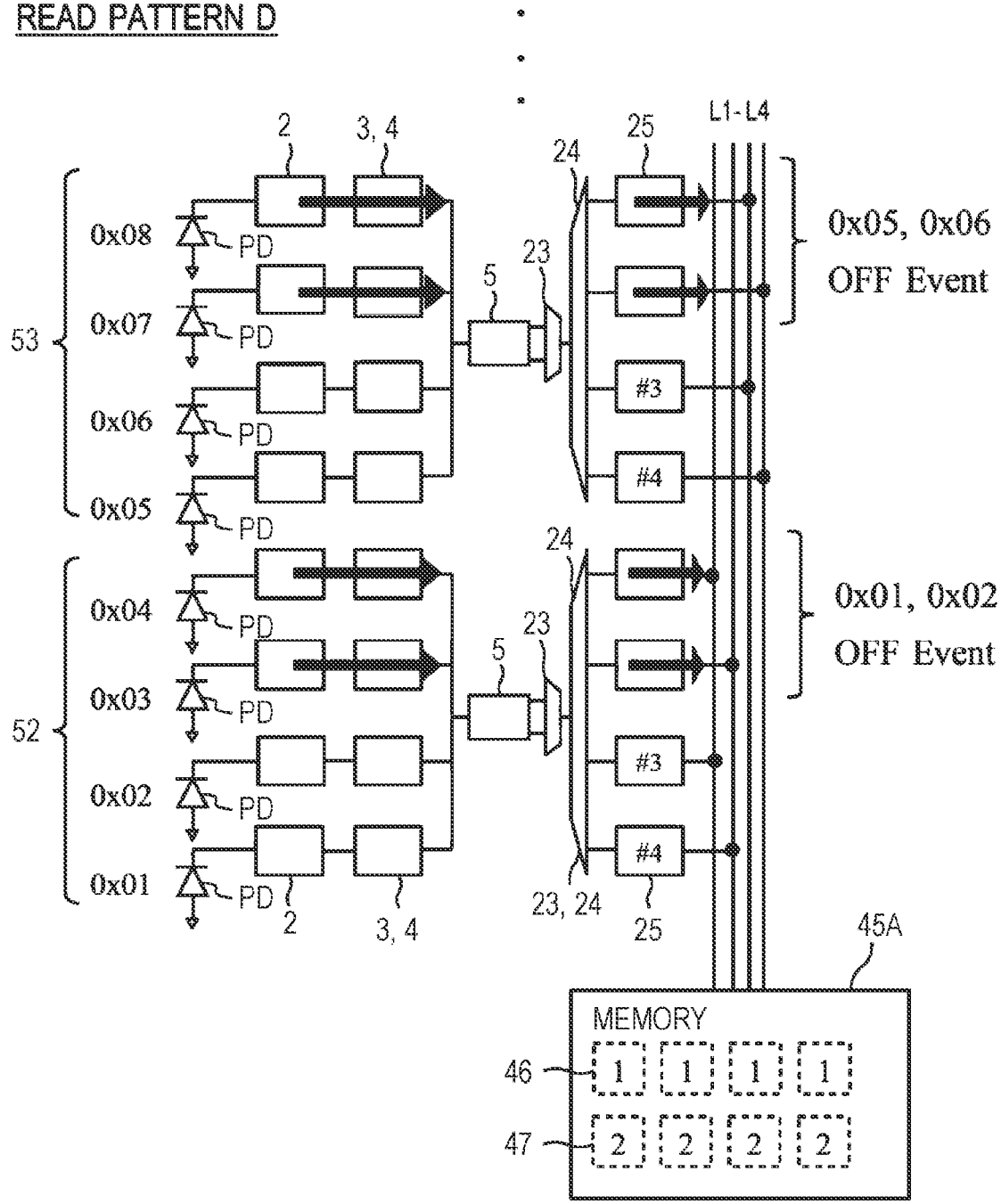
FIG. 23 is a view illustrating an example of a phase #(N+1) of the read pattern D.

FIGS. 22 and 23 illustrate examples of read patterns (READ PATTERN D) in the address event circuits 52 and 53 connected to the read lines L1 to L4. Address assignment and connection relationships with the read lines L1 to L4 in the examples of FIGS. 22 and 23 are similar to those in the examples of FIGS. 18 and 19 described above.

FIG. 22 illustrates operation in phase #N. In the phase #N, ON events are read for the photodiodes PD at the addresses 0x01 and 0x02 of the address event circuit 52 and the addresses 0x05 and 0x06 of the address event circuit 53. The ON events read in the phase are stored in the memory 45A via the read lines L1 to L4. Each of the four data fragments 46 in the memory 45A corresponds to the ON event read in the phase #N.

FIG. 23 illustrates operation in phase #(N+1) corresponding to the next phase of the phase in FIG. 22. In phase #(N+1), OFF events are read for the photodiodes PD at addresses 0x03 and 0x04 of the address event circuit 52 and addresses 0x07 and 0x08 of the address event circuit 53. The ON events read in the phase are stored in the memory 45A via the read lines L1 to L4. Each of the four data fragments 47 in the memory 45A corresponds to the ON event read in the phase #N.

As illustrated in the read pattern (READ PATTERN D) of FIGS. 22 and 23, ON events or OFF events may be simultaneously read for a plurality of address event circuits. In a case where the read pattern (READ PATTERN D) illustrated in FIGS. 22 and 23 is used, reading of the event in one address event circuit is completed in a plurality of phases, and thus, it is necessary to use a buffer with eight 8 lines as the memory 45A connected to the read lines L1 to L4. As described above, the imaging device according to the present disclosure may be configured such that the ON events or the OFF events stored in the latch circuits are alternately read and transferred to the storage unit for the plurality of imaging circuits.

Figure 24:
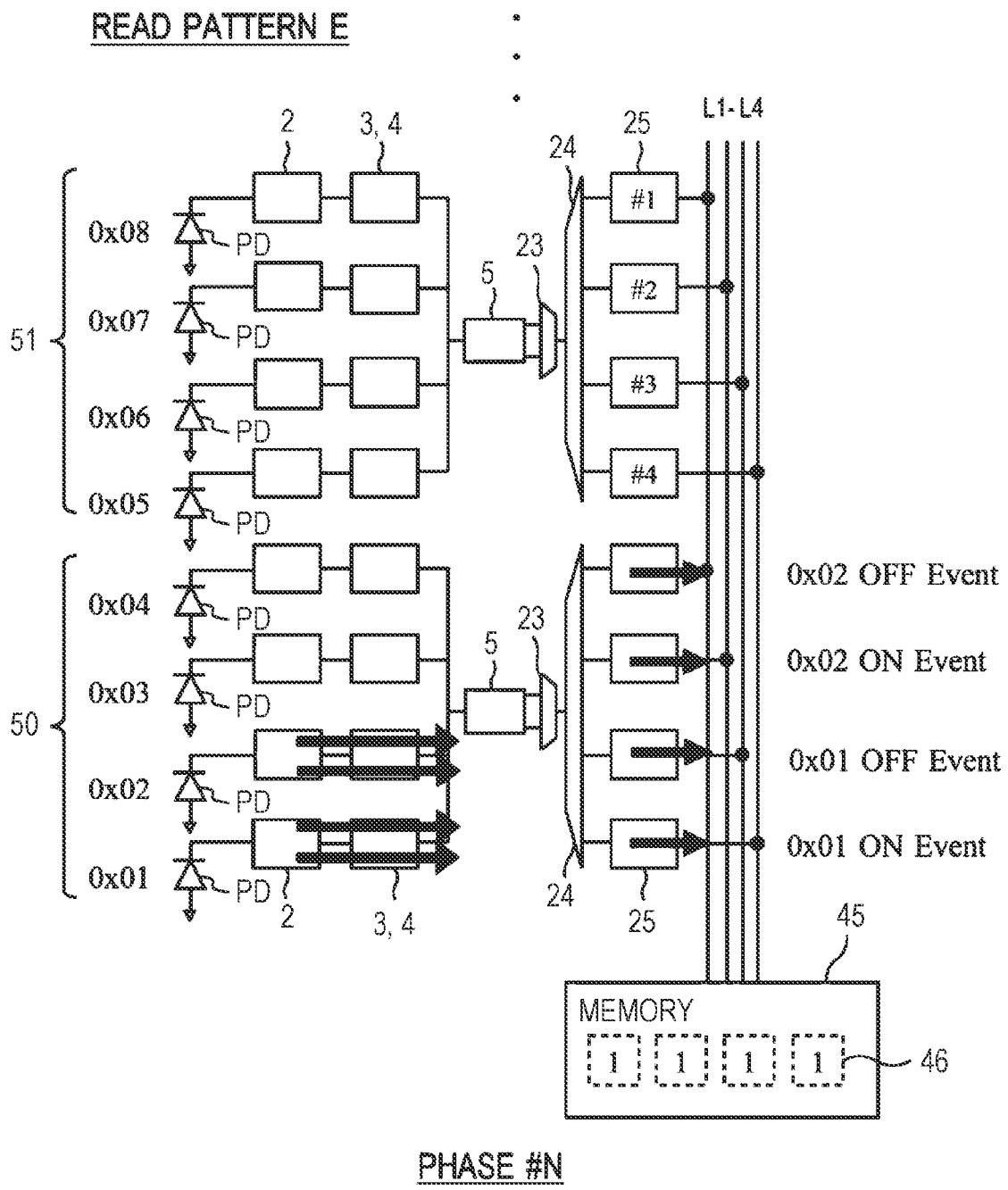
FIG. 24 is a view illustrating an example of a phase #N of a read pattern E.
Figure 25:
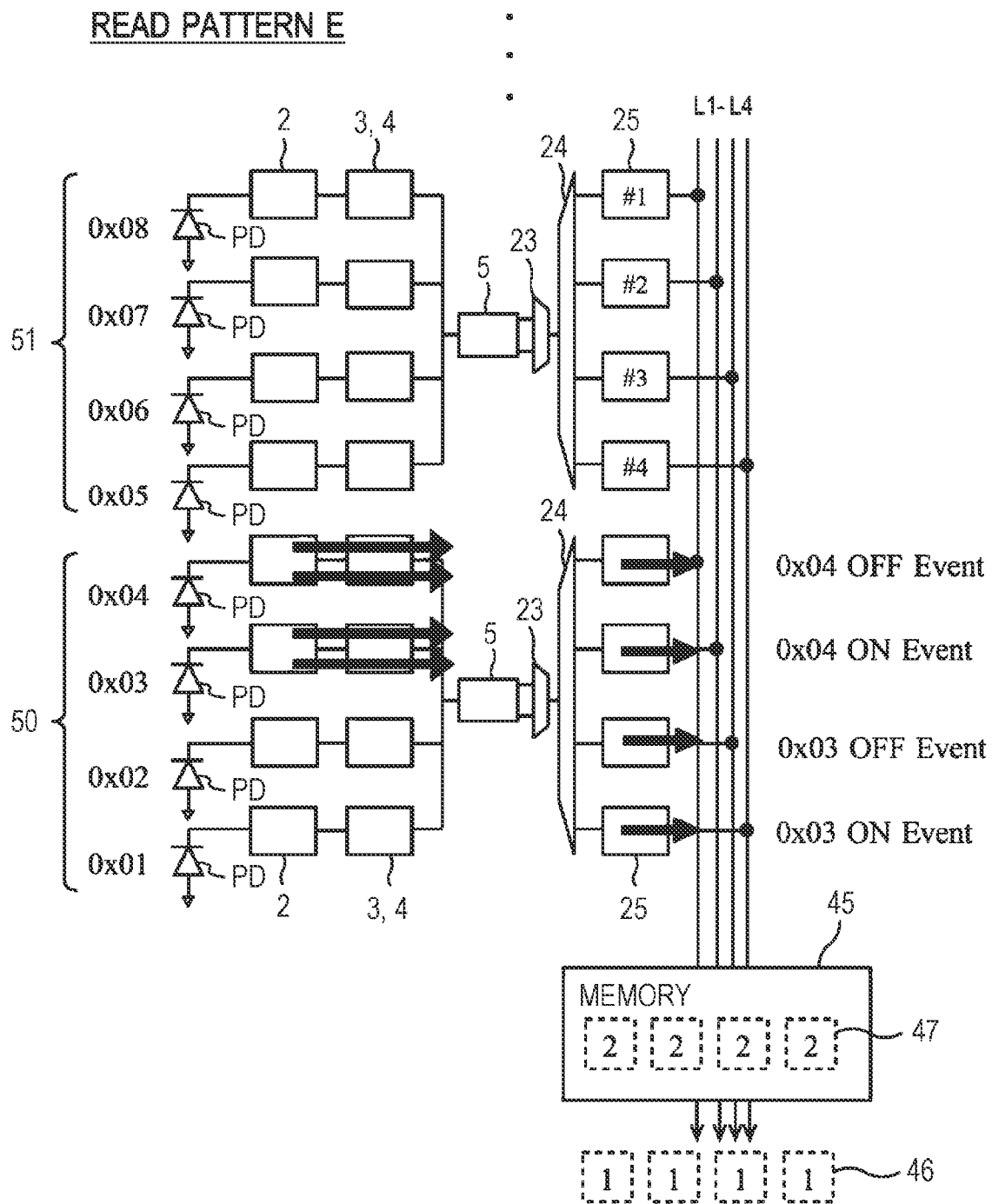
FIG. 25 is a view illustrating an example of a phase #(N+1) of the read pattern E.

FIGS. 24 and 25 illustrate examples of read patterns (READ PATTERN E) in the address event circuits 50 and 51 connected to the read lines L1 to L4. Address assignment and connection relationships with the read lines L1 to L4 in the examples of FIGS. 24 and 25 are similar to those in the examples of FIGS. 16 and 17 described above.

FIG. 24 illustrates operation in phase #N. In the phase #N, ON events and OFF events are read for the photodiodes PD at the addresses 0x01 and 0x02 of the address event circuit 50. Thus, the address event circuit 50 is controlled such that the ON event of the photodiode PD at the address 0x01, the OFF event of the photodiode PD at the address 0x01, the ON event of the photodiode PD at the address 0x02, and the OFF event of the photodiode PD at the address 0x02 are stored in any one of the latch circuits 25. In other words, in the phase #N, the read processing is executed twice for the same circuit block in the address event circuit 50.

The events read in the phase are stored in the memory 45 via the read lines L1 to L4. Each of the four data fragments 46 in the memory 45 corresponds to the event read in the phase #N.

As described above, the imaging circuit according to the present disclosure may be configured to read both the ON events and the OFF events for at least some selected photoelectric conversion elements among the plurality of photoelectric conversion elements and store each of the ON events and the OFF events in the plurality of latch circuits.

FIG. 25 illustrates operation in phase #(N+1) corresponding to the next phase of the phase in FIG. 24. In the phase #(N+1), ON events and OFF events are read for the photodiodes PD at the addresses 0x03 and 0x04 of the address event circuit 50. Thus, the address event circuit 50 is controlled such that the ON event of the photodiode PD at the address 0x03, the OFF event of the photodiode PD at the address 0x03, the ON event of the photodiode PD at the address 0x04, and the OFF event of the photodiode PD at the address 0x04 are stored in any one of the latch circuits 25. In other words, in the phase #(N+1), the read processing is executed twice for the same circuit block in the address event circuit 50.

The four data fragments 46 corresponding to the events read in the previous phase are transferred from the memory 45 to a subsequent circuit. Then, content of the events read in the phase is stored in the memory 45 via the read lines L1 to L4. Each of the four data fragments 47 in the memory 45 corresponds to the event read in the phase #(N+1).

As described above, the imaging circuit according to the present disclosure may be configured to read both the ON events and the OFF events for the remaining photoelectric conversion elements among the plurality of photoelectric conversion elements after the ON events and the OFF events stored in the plurality of latch circuits are transferred via the read line and store each of the ON events and the OFF events in the plurality of latch circuits.

In a case where the read pattern (READ PATTERN E) of FIGS. 24 and 25 is adopted, data corresponding to an ON event and an OFF event in one address event circuit is obtained through two phases of read processing. In addition, in a case of this read pattern, it is only necessary to use a buffer with four lines as the memory 45.

Figure 26:
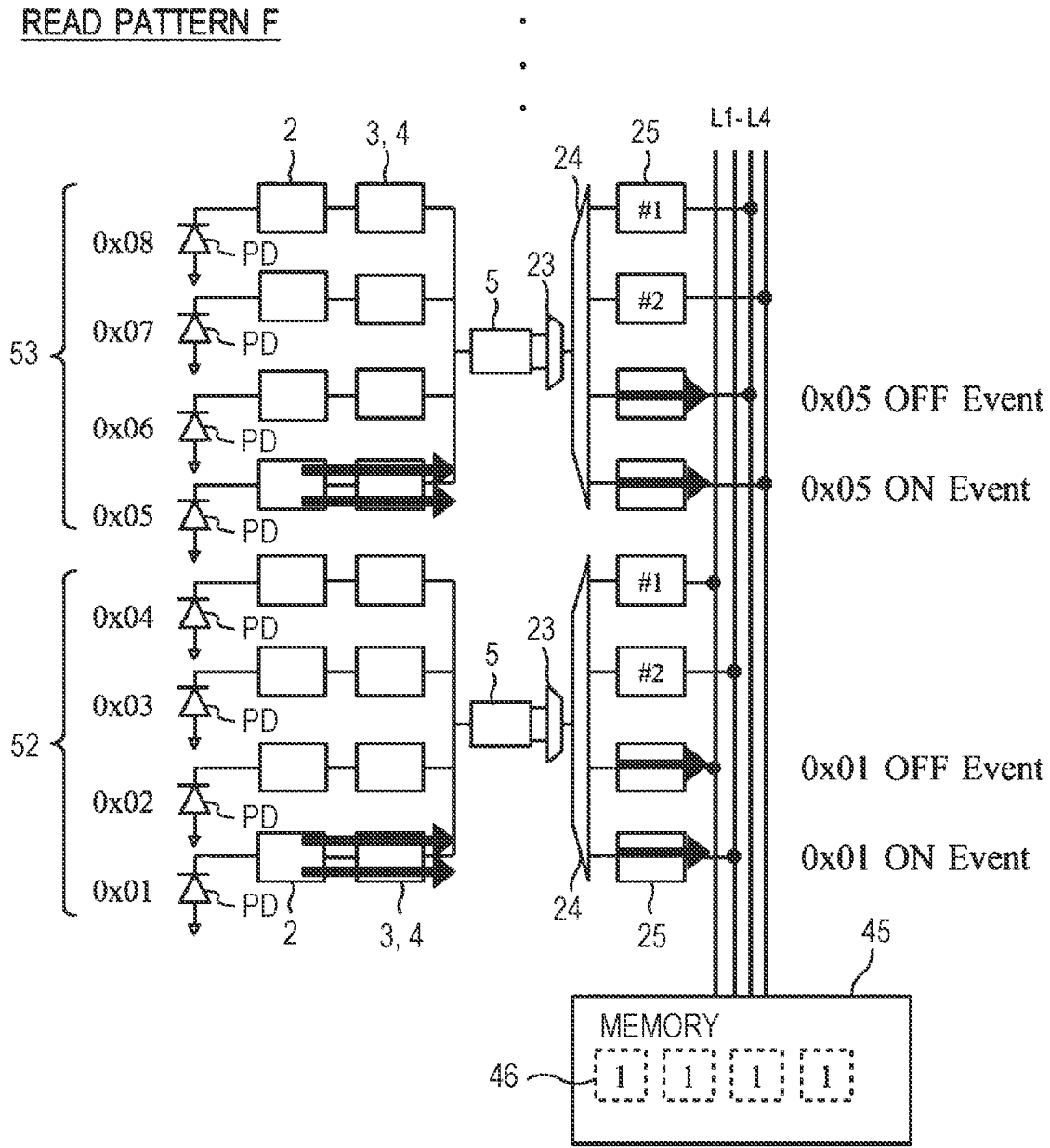
FIG. 26 is a view illustrating an example of a phase #N of a read pattern F.
Figure 27:
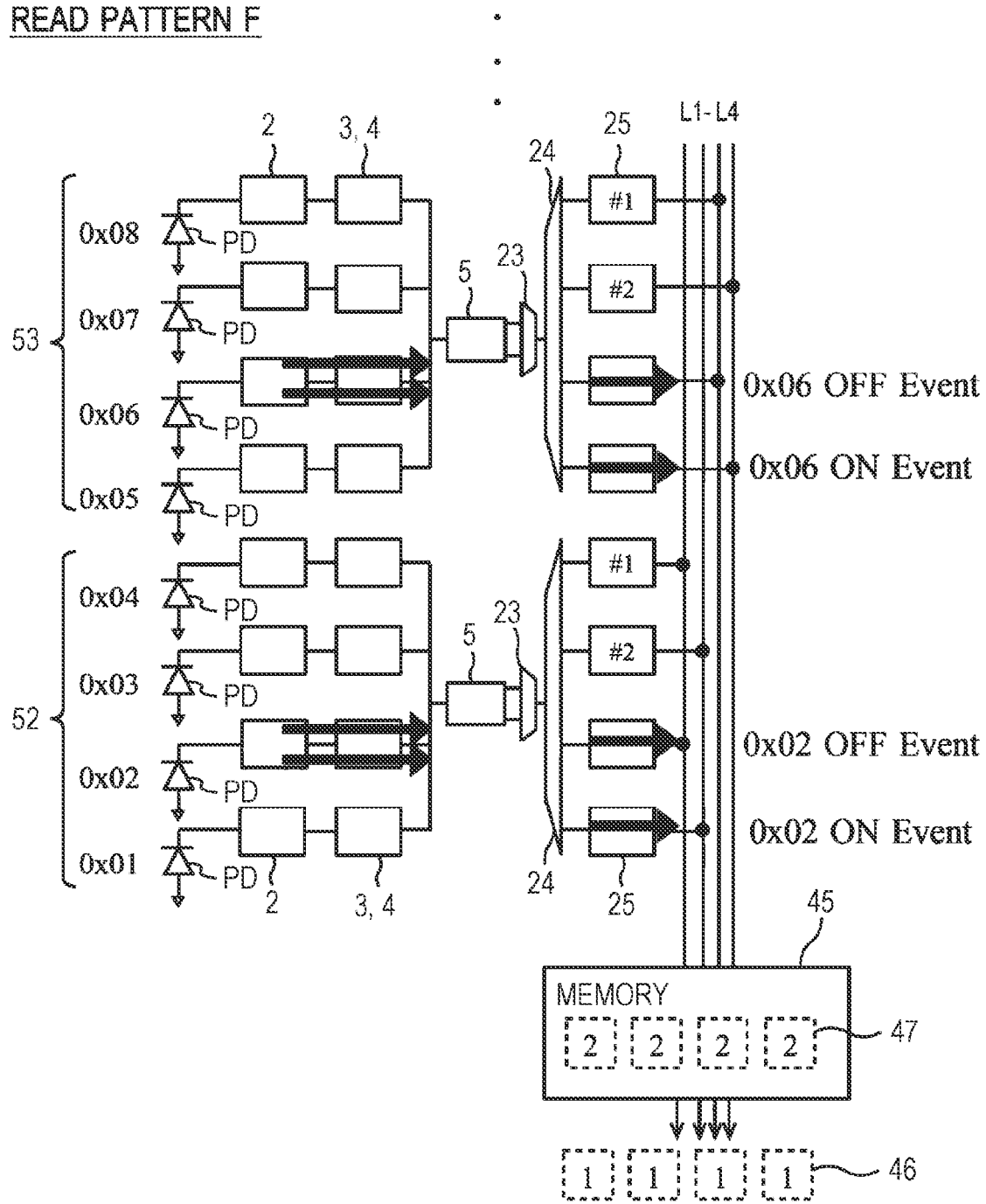
FIG. 27 is a view illustrating an example of a phase #(N+1) of the read pattern F.

FIGS. 26 and 27 illustrate examples of read patterns (READ PATTERN F) in the address event circuits 50 and 51 connected to the read lines L1 to L4. Address assignment and connection relationships with the read lines L1 to L4 in the examples of FIGS. 24 and 25 are similar to those in the examples of FIGS. 18 and 19 described above.

FIG. 26 illustrates operation in phase #N. In the phase #N, ON events and OFF events are read for the photodiode PD at the address 0x01 of the address event circuit 52 and the photodiode PD at the address 0x05 of the address event circuit 53. Thus, the address event circuit 52 is controlled such that the ON event of the photodiode PD at the address 0x01 and the OFF event of the photodiode PD at the address 0x01 are stored in any one of the latch circuits 25. Furthermore, the address event circuit 53 is controlled such that the ON event of the photodiode PD at the address 0x05 and the OFF event of the photodiode PD at the address 0x05 are stored in any one of the latch circuits 25. In other words, in the phase #N, the address event circuits 52 and 53 perform read processing twice for the same circuit block.

The events read in the phase are stored in the memory 45 via the read lines L1 to L4. Each of the four data fragments 46 in the memory 45 corresponds to the event read in the phase #N.

FIG. 27 illustrates operation in phase #(N+1) corresponding to the next phase of the phase in FIG. 26. In phase #(N+1), ON events and OFF events are read for the photodiodes PD at address 0x02 of address event circuit 52 and address 0x06 of address event circuit 53. Thus, the address event circuit 52 is controlled such that the ON event of the photodiode PD at the address 0x02 and the OFF event of the photodiode PD at the address 0x02 are stored in any one of the latch circuits 25. Furthermore, the address event circuit 53 is controlled such that the ON event of the photodiode PD at the address 0x06 and the OFF event of the photodiode PD at the address 0x06 are stored in any one of the latch circuits 25. In other words, in the phase #(N+1), the address event circuits 52 and 53 execute read processing twice for the same circuit block.

The four data fragments 46 corresponding to the events read in the previous phase are transferred from the memory 45 to a subsequent circuit. Then, content of the events read in the phase is stored in the memory 45 via the read lines L1 to L4. Each of the four data fragments 47 in the memory 45 corresponds to the event read in the phase #(N+1).

In the subsequent phases, events in the photodiodes PD at the addresses 0x03 and 0x04 of the address event circuit 52 and the photodiodes PD at the addresses 0x07 and 0x08 of the address event circuit 53 can be read through processing similar to the processing as described above. As described above, in the imaging device according to the present disclosure, the address events read from the imaging circuits and transferred to the storage unit may include both an ON event and an OFF event.

Figure 28:
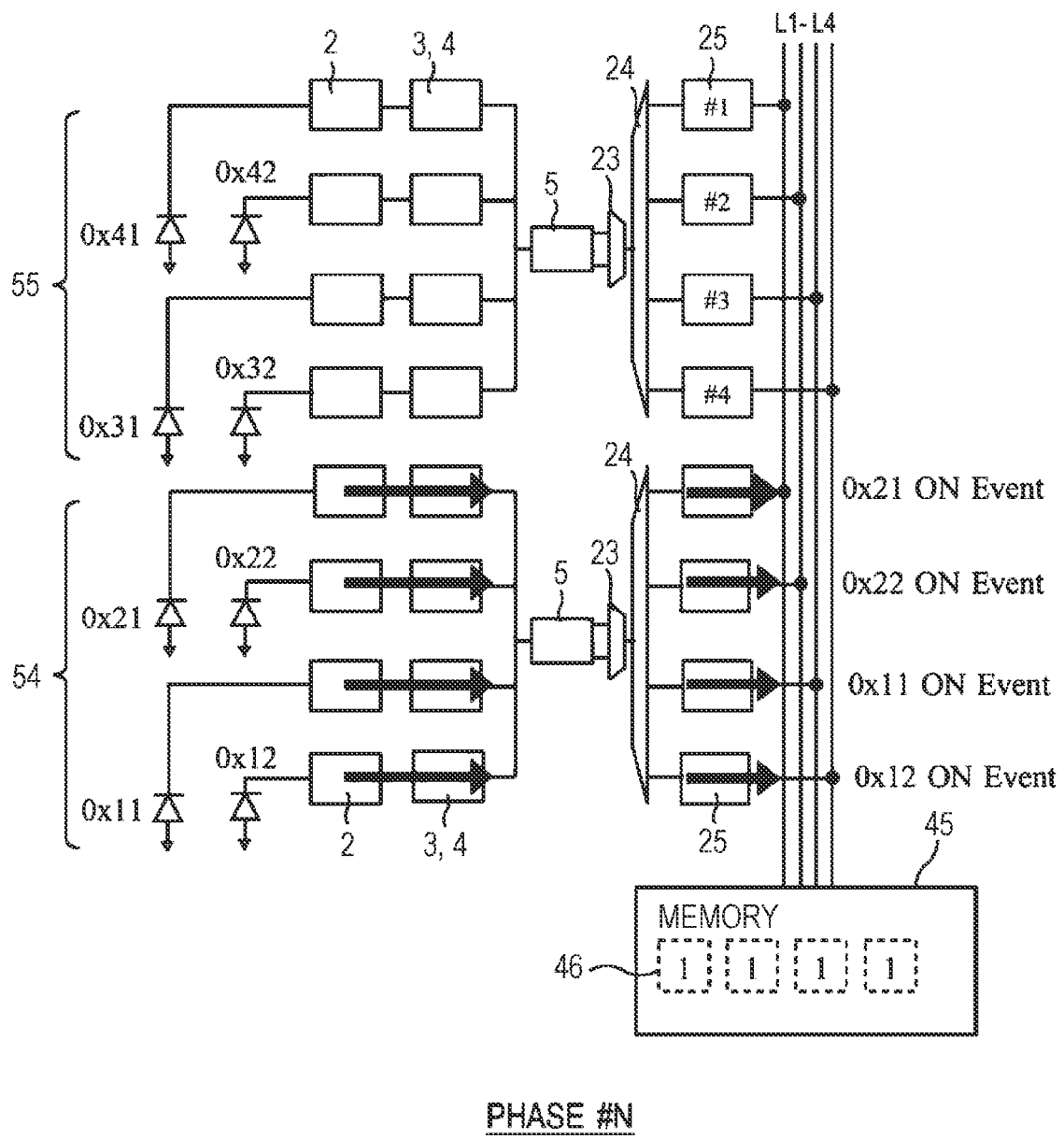
FIG. 28 is a view illustrating an example of a phase #N of a read pattern G.
Figure 29:
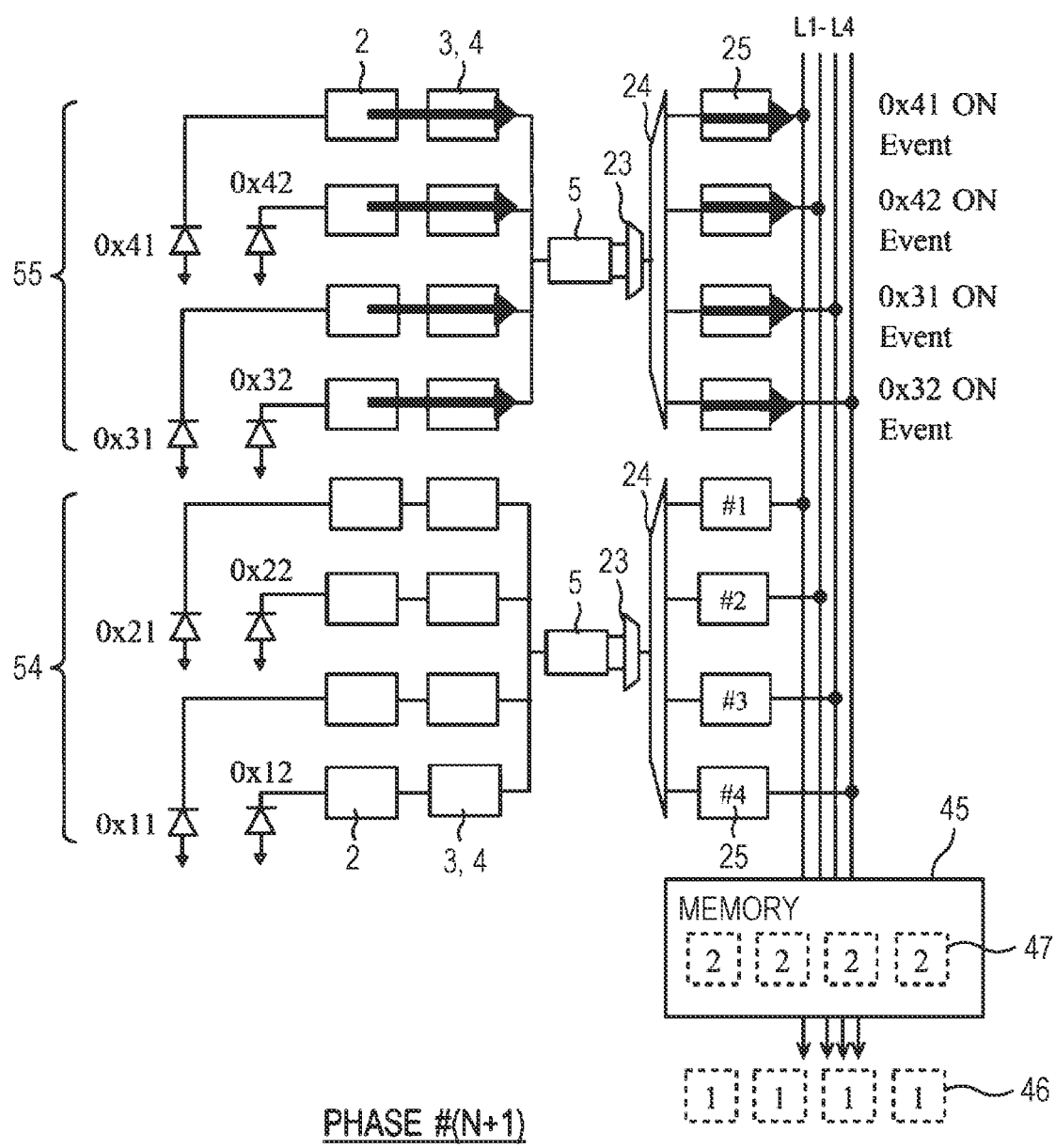
FIG. 29 is a view illustrating an example of a phase #(N+1) of the read pattern G.
Figure 30:
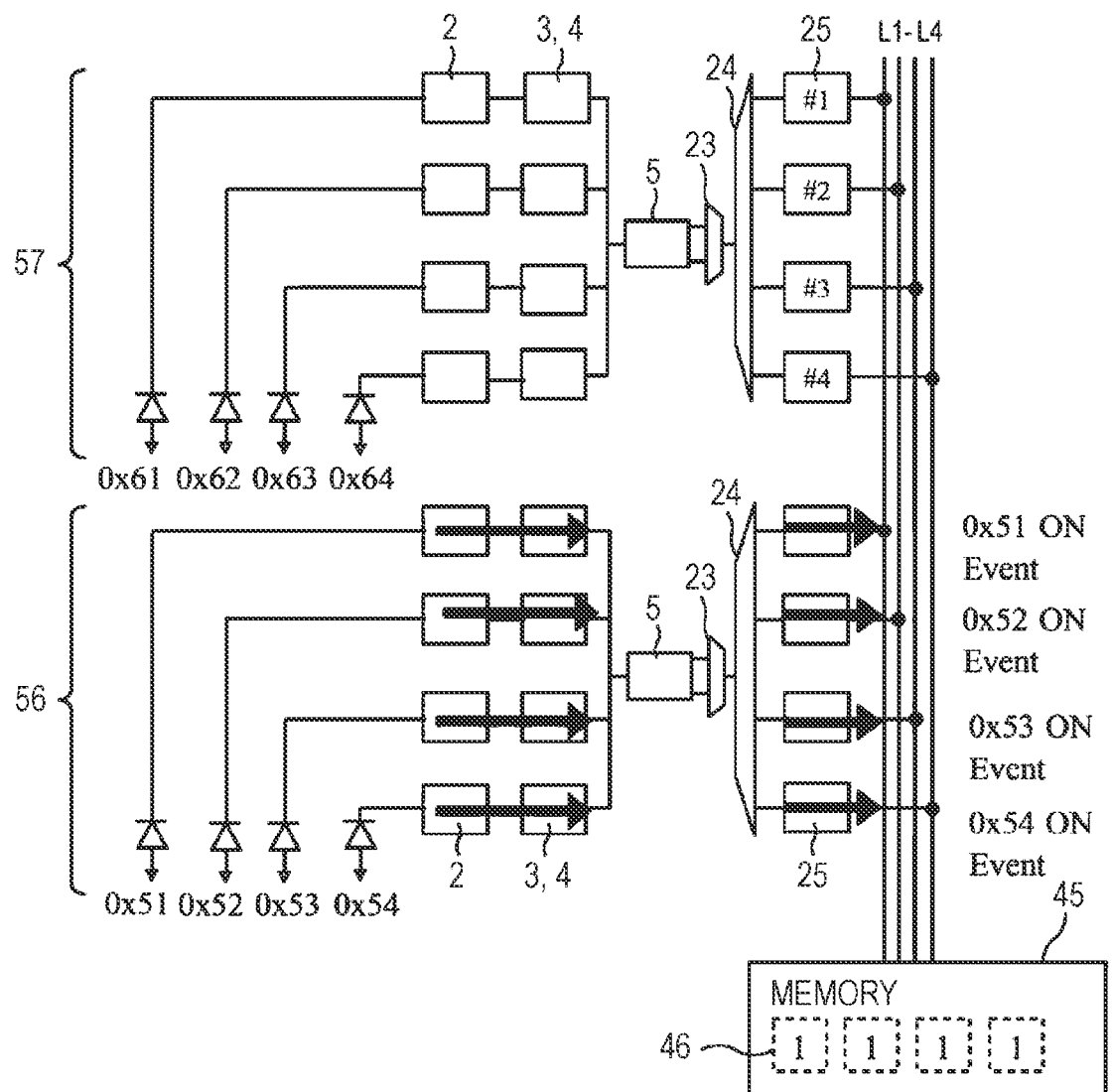
FIG. 30 is a view illustrating an example of a phase #N of a read pattern H.
Figure 31:
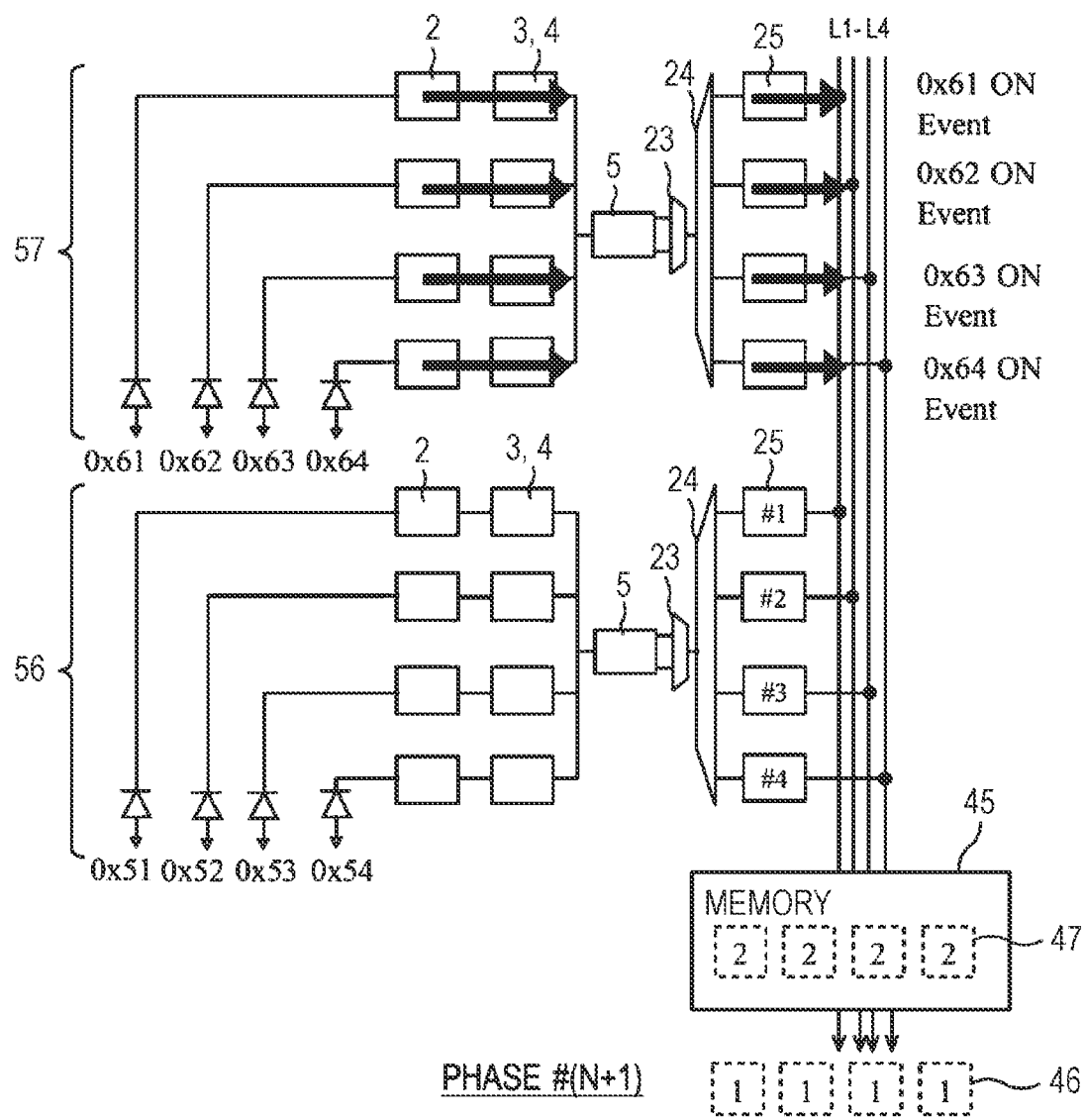
FIG. 31 is a view illustrating an example of a phase #(N+1) of the read pattern H.

In the imaging circuit according to the present disclosure, the plurality of photodiodes PD does not necessarily have to be arranged in a direction substantially parallel to the read lines as described above. For example, as illustrated in FIGS. 28 and 29, the photodiodes PD included in one address event circuit may be arranged in two rows (two columns). Furthermore, as illustrated in FIGS. 30 and 31 below, a plurality of photodiodes PD in the address event circuit may be arranged in a direction substantially perpendicular to the read lines. In other words, the plurality of photoelectric conversion elements may be arranged in a direction substantially perpendicular to the read lines.

FIGS. 28 and 29 illustrate examples of read patterns (READ PATTERN G) in the address event circuits 54 and 55 connected to the read lines L1 to L4. Addresses of 0x11, 0x12, 0x21, and 0x22 are assigned to the plurality of photodiodes PD of the address event circuit 54. On the other hand, addresses of 0x31, 0x32, 0x41, and 0x42 are assigned to the plurality of photodiodes PD of the address event circuit 55. The photodiodes PD at the addresses 0x11, 0x21, 0x31, and 0x41 form columns (rows) parallel to the read lines. In a similar manner, the photodiodes PD at the addresses 0x12, 0x22, 0x32, and 0x42 also form columns (rows) parallel to the read lines.

In the address event circuits 54 and 55, the latch circuit #1 is connected to the read line L1. Further, in the address event circuits 50 and 51, the latch circuit #2 is connected to the read line L2. In a similar manner, the latch circuit #3 is connected to the read line L3, and the latch circuit #4 is connected to the read line L4.

FIG. 28 illustrates operation in phase #N. In the phase #N, ON events are read for the photodiodes PD at the addresses 0x11, 0x12, 0x21, and 0x22 of the address event circuit 54. The ON events read in the phase are stored in the memory 45 via the read lines L1 to L4. Each of four data fragments 46 in the memory 45 corresponds to the read ON event.

FIG. 29 illustrates operation in phase #(N+1) corresponding to the next phase of the phase in FIG. 28. In the phase #(N+1), ON events are read for the photodiodes PD at the addresses 0x31, 0x32, 0x41, and 0x42 of the address event circuit 55. The four data fragments 46 corresponding to the ON events read in the previous phase are transferred from the memory 45 to a circuit at a subsequent stage. Then, the ON events read in the phase are stored in the memory 45 via the read lines L1 to L4. Each of the four data fragments 47 in the memory 45 corresponds to the ON event read in the phase #(N+1).

In a case where the read pattern (READ PATTERN G) illustrated in FIGS. 28 and 29 is used, it is only necessary to use a buffer with four lines as the memory 45 connected to the read lines L1 to L4. While in the examples of FIGS. 28 and 29, a case where the ON events are read has been described as an example, the OFF events may be read using a similar method. In addition, as described above, the address event circuit may be caused to execute the read processing a plurality of times in the same phase, and both the ON events and the OFF events may be read in the same phase.

FIGS. 30 and 31 illustrate examples of read patterns (READ PATTERN H) in the address event circuits 56 and 57 connected to the read lines L1 to L4. Addresses of 0x51, 0x52, 0x53, and 0x54 are assigned to the plurality of photodiodes PD of the address event circuit 56. On the other hand, addresses of 0x61, 0x62, 0x63, and 0x64 are assigned to the plurality of photodiodes PD of the address event circuit 57. The photodiodes PD at addresses 0x51, 0x52, 0x53, and 0x54 form columns (rows) in a direction substantially perpendicular to the read lines. In a similar manner, the photodiodes PD at the addresses 0x61, 0x62, 0x63, and 0x64 also form columns (rows) in the direction substantially perpendicular to the read lines.

In the address event circuits 56 and 57, the latch circuit #1 is connected to the read line L1. In the address event circuits 56 and 57, the latch circuit #2 is connected to the read line L2. In a similar manner, the latch circuit #3 is connected to the read line L3, and the latch circuit #4 is connected to the read line L4.

FIG. 30 illustrates operation in phase #N. In the phase #N, ON events are read for the photodiodes PD at the addresses 0x51, 0x52, 0x53, and 0x54 of the address event circuit 56. The ON events read in the phase are stored in the memory 45 via the read lines L1 to L4. Each of four data fragments 46 in the memory 45 corresponds to the read ON event.

FIG. 31 illustrates operation in phase #(N+1) corresponding to the next phase of the phase in FIG. 30. In the phase #(N+1), ON events are read for the photodiodes PD at the addresses 0x61, 0x62, 0x63, and 0x64 of the address event circuit 57. The four data fragments 46 corresponding to the ON events read in the previous phase are transferred from the memory 45 to a circuit at a subsequent stage. Then, the ON events read in the phase are stored in the memory 45 via the read lines L1 to L4. Each of the four data fragments 47 in the memory 45 corresponds to the ON event read in the phase #(N+1).

In a case where the read pattern (READ PATTERN H) illustrated in FIGS. 30 and 31 is used, it is only necessary to use a buffer with four lines as the memory 45 connected to the read lines L1 to L4. While in the examples of FIGS. 30 and 31, a case where the ON events are read has been described as an example, the OFF events may be read using a similar method. In addition, as described above, the address event circuit may be caused to execute the read processing a plurality of times in the same phase, and both the ON events and the OFF events may be read in the same phase.

If the imaging circuit according to the present disclosure is used, high-speed event reading can be performed while reducing the number of latch circuits to be mounted on the address event circuit. This makes it possible to achieve an asynchronous imaging element capable of generating and outputting data at high speed while reducing a circuit scale. For example, in a traffic field, it is possible to improve safety by executing processing of recognizing an image of a person or an obstacle at high speed.

Figure 32:
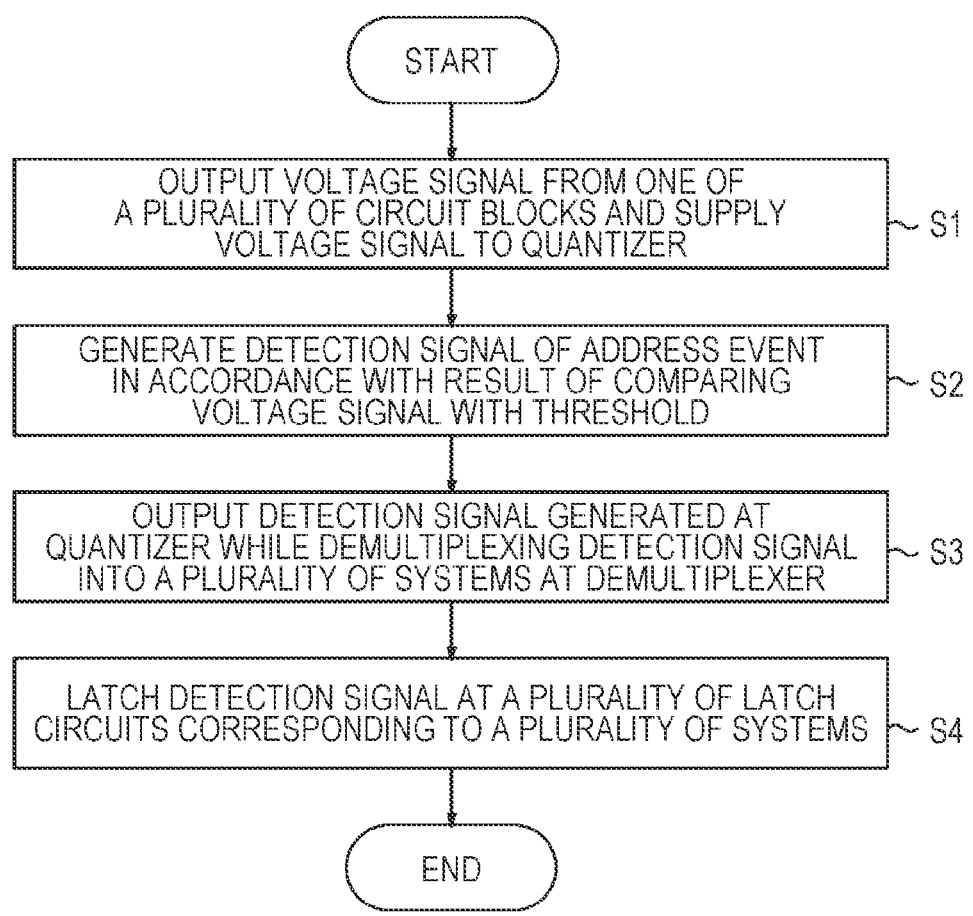
FIG. 32 is a flowchart illustrating an example of imaging processing of the imaging device according to the present disclosure.

FIG. 32 is a flowchart illustrating an example of imaging processing of the imaging device 100 according to the present disclosure. First, a voltage signal is output from at least one of a plurality of circuit blocks including a photoelectric conversion element (photodiode PD) that photoelectrically converts incident light to generate a photocurrent and a current-voltage conversion circuit 2 that converts the photocurrent into a voltage signal, and the voltage signal is supplied to a quantizer (step S1).

Next, the quantizer 5 generates a detection signal of an address event in accordance with a result of comparing the voltage signal with a threshold (step S2).

Next, the detection signal generated by the quantizer 5 is output while the detection signal is demultiplexed into a plurality of systems at the demultiplexer 24 (step 33).

Next, the imaging processing includes a step of latching the detection signal by the plurality of latch circuits 25a to 25d corresponding to the plurality of systems.

The technology according to the present disclosure (present technology) can be applied to various products. For example, the technology according to the present disclosure may be implemented as a device to be mounted on any type of mobile body such as an automobile, an electric vehicle, a hybrid electric vehicle, a motorcycle, a bicycle, a personal mobility, an airplane, a drone, a ship, and a robot.

Figure 33:
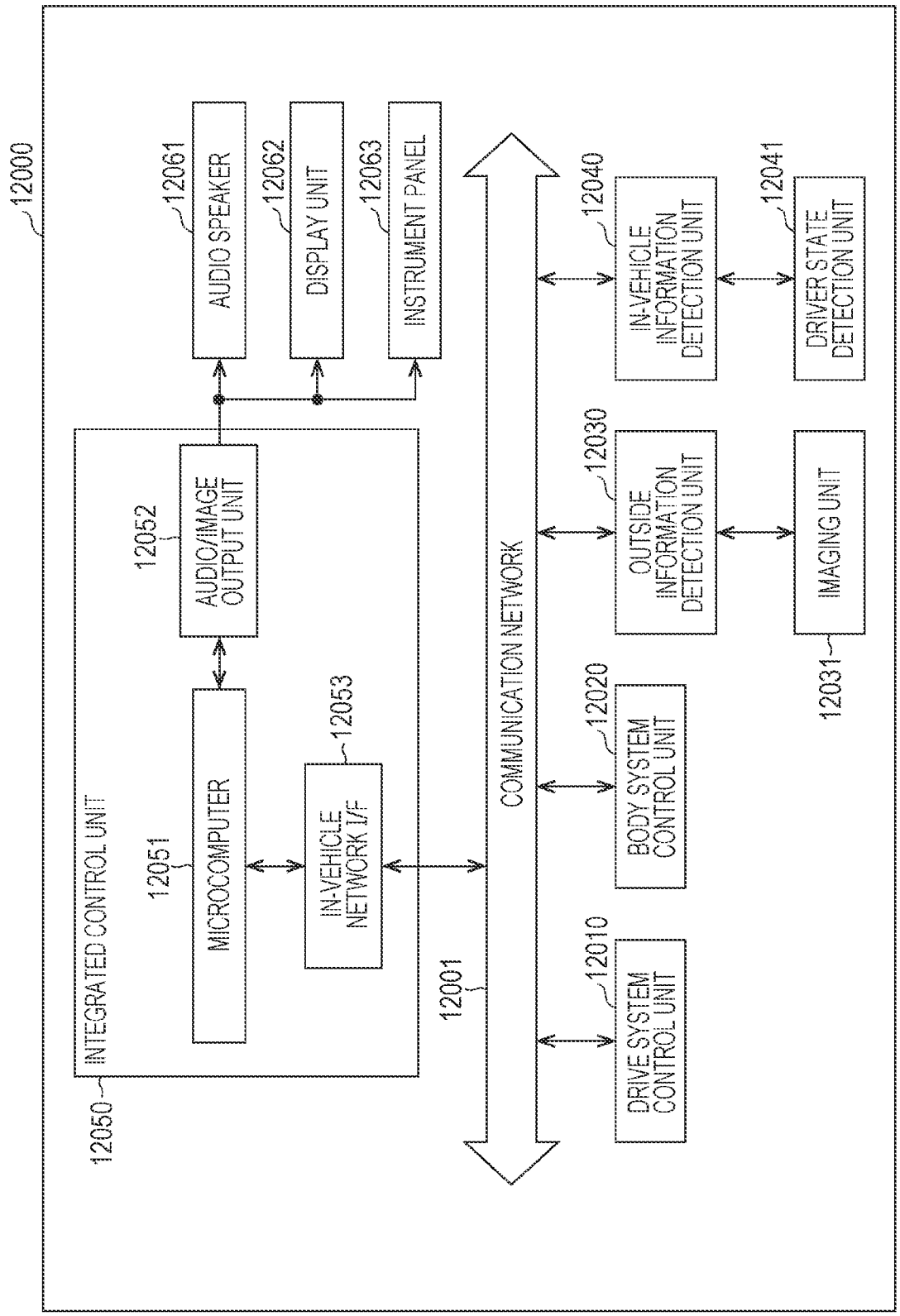
FIG. 33 is a block diagram illustrating a schematic configuration example of a vehicle control system.

FIG. 33 is a block diagram illustrating a schematic configuration example of a vehicle control system which is an example of a moving body control system to which the technology according to the present disclosure can be applied.

A vehicle control system 12000 includes a plurality of electronic control units connected via a communication network 12001. In the example illustrated in FIG. 33, the vehicle control system 12000 includes a drive system control unit 12010, a body system control unit 12020, an outside information detection unit 12030, an in-vehicle information detection unit 12040, and an integrated control unit 12050. Furthermore, as a functional configuration of the integrated control unit 12050, a microcomputer 12051, an audio/image output unit 12052, and an in-vehicle network interface (I/F) 12053 are illustrated.

The drive system control unit 12010 controls operation of devices related to a drive system of the vehicle in accordance with various programs. For example, the drive system control unit 12010 functions as a control device of a driving force generation device for generating a driving force of the vehicle such as an internal combustion engine and a driving motor, a driving force transmission mechanism for transmitting the driving force to wheels, a steering mechanism for adjusting a steering angle of the vehicle, a braking device for generating a braking force of the vehicle, and the like.

The body system control unit 12020 controls operations of various devices mounted on the vehicle body in accordance with various programs. For example, the body system control unit 12020 functions as a control device of a keyless entry system, a smart key system, a power window device, or various lamps such as a head lamp, a back lamp, a brake lamp, a blinker, and a fog lamp. In this case, radio waves transmitted from a portable device that substitutes for a key or signals of various switches can be input to the body system control unit 12020. The body system control unit 12020 receives input of these radio waves or signals and controls a door lock device, a power window device, a lamp, and the like, of the vehicle.

The outside information detection unit 12030 detects information outside the vehicle on which the vehicle control system 12000 is mounted. For example, an imaging unit 12031 is connected to the outside information detection unit 12030. The outside information detection unit 12030 causes the imaging unit 12031 to capture an image of the outside of the vehicle and receives the captured image. The outside information detection unit 12030 may perform object detection processing or distance detection processing of a person, a vehicle, an obstacle, a sign, a character on a road surface, or the like, on the basis of the received image.

The imaging unit 12031 is an optical sensor that receives light and outputs an electric signal corresponding to an amount of the received light. The imaging unit 12031 can output the electric signal as an image or can output the electric signal as distance measurement information. Furthermore, the light received by the imaging unit 12031 may be visible light or invisible light such as infrared light.

The in-vehicle information detection unit 12040 detects information inside the vehicle. For example, a driver state detection unit 12041 that detects a state of a driver is connected to the in-vehicle information detection unit 12040. The driver state detection unit 12041 includes, for example, a camera that images the driver, and the in-vehicle information detection unit 12040 may calculate a degree of fatigue or a degree of concentration of the driver or may determine whether or not the driver is dozing off on the basis of the detection information input from the driver state detection unit 12041.

The microcomputer 12051 can calculate a control target value of the driving force generation device, the steering mechanism or the braking device on the basis of the information inside and outside the vehicle acquired by the outside information detection unit 12030 or the in-vehicle information detection unit 12040 and output a control command to the drive system control unit 12010. For example, the microcomputer 12051 can perform cooperative control for the purpose of implementing functions of an advanced driver assistance system (ADAS) including collision avoidance or impact mitigation of the vehicle, follow-up traveling based on a distance between vehicles, traveling while maintaining vehicle speed, warning of vehicle collision, warning of departure of the vehicle from a lane, or the like.

Furthermore, the microcomputer 12051 controls the driving force generation device, the steering mechanism, the braking device, or the like, on the basis of the information around the vehicle acquired by the outside information detection unit 12030 or the in-vehicle information detection unit 12040, thereby performing cooperative control for the purpose of automatic driving or the like, in which the vehicle autonomously travels without depending on the operation of the driver.

Furthermore, the microcomputer 12051 can output a control command to the body system control unit 12020 on the basis of the outside information acquired by the outside information detection unit 12030. For example, the microcomputer 12051 can perform cooperative control for the purpose of preventing glare, such as switching from a high beam to a low beam, by controlling the head lamp in accordance with a position of a preceding vehicle or an oncoming vehicle detected by the outside information detection unit 12030.

The audio/image output unit 12052 transmits an output signal of at least one of audio or an image to an output device capable of visually or audibly notifying a passenger of the vehicle or the outside of the vehicle of information. In the example of FIG. 33, an audio speaker 12061, a display unit 12062, and an instrument panel 12063 are illustrated as the output device. The display unit 12062 may include, for example, at least one of an on-board display or a head-up display.

Figure 34:
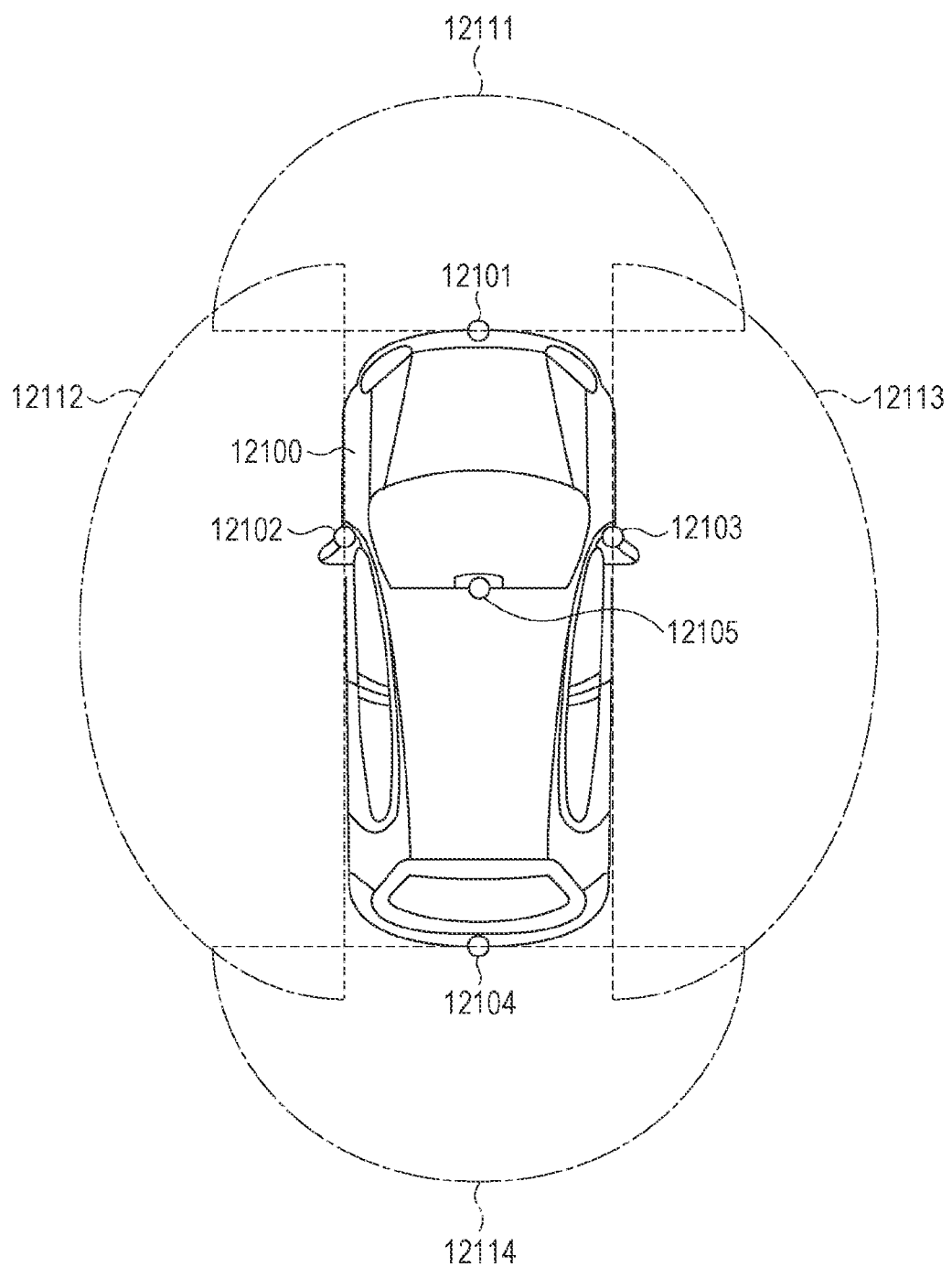
FIG. 34 is a view illustrating an example of positions where an imaging unit and an outside information detection unit are provided.

FIG. 34 is a view illustrating an example of a position where the imaging unit 12031 is provided.

In FIG. 34, a vehicle 12100 includes imaging units 12101, 12102, 12103, 12104, and 12105 as the imaging unit 12031.

The imaging units 12101, 12102, 12103, 12104, and 12105 are provided, for example, at positions such as a front nose, a side mirror, a rear bumper, a back door, and an upper portion of a windshield in a vehicle interior of the vehicle 12100. The imaging unit 12101 provided at the front nose and the imaging unit 12105 provided at the upper portion of the windshield in the vehicle interior mainly acquire images in front of the vehicle 12100. The imaging units 12102 and 12103 provided at the side mirrors mainly acquire images of the sides of the vehicle 12100. The imaging unit 12104 provided on the rear bumper or the back door mainly acquires an image behind the vehicle 12100. The front images acquired by the imaging units 12101 and 12105 are mainly used for detecting a preceding vehicle, a pedestrian, an obstacle, a traffic light, a traffic sign, a lane, or the like.

Note that FIG. 34 illustrates an example of imaging ranges of the imaging units 12101 to 12104. An imaging range 12111 indicates an imaging range of the imaging unit 12101 provided at the front nose, imaging ranges 12112 and 12113 respectively indicate imaging ranges of the imaging units 12102 and 12103 provided at the side mirrors, and an imaging range 12114 indicates an imaging range of the imaging unit 12104 provided at the rear bumper or the back door. For example, by superimposing image data captured by the imaging units 12101 to 12104, a panoramic image of the vehicle 12100 viewed from above can be obtained.

At least one of the imaging units 12101 to 12104 may have a function of acquiring distance information. For example, at least one of the imaging units 12101 to 12104 may be a stereo camera including a plurality of imaging elements or may be an imaging element having pixels for phase difference detection.

For example, the microcomputer 12051 can extract, as a preceding vehicle, a three-dimensional object traveling at predetermined speed (for example, equal to or higher than 0 km/h) in substantially the same direction as the vehicle 12100, in particular, the closest three-dimensional object on a traveling path of the vehicle 12100 by obtaining a distance to each three-dimensional object in the imaging ranges 12111 to 12114 and temporal change of the distance (relative speed with respect to the vehicle 12100) on the basis of the distance information obtained from the imaging units 12101 to 12104. Furthermore, the microcomputer 12051 can set an inter-vehicle distance to be secured in advance with respect to the preceding vehicle and can perform automatic brake control (including follow-up stop control), automatic acceleration control (including follow-up start control), and the like. As described above, it is possible to perform cooperative control for the purpose of automatic driving, or the like, in which the vehicle autonomously travels without depending on operation of the driver.

For example, on the basis of the distance information obtained from the imaging units 12101 to 12104, the microcomputer 12051 can extract three-dimensional object data regarding three-dimensional objects while classifying the three-dimensional object data into two-wheeled vehicles, ordinary vehicles, large vehicles, pedestrians and other three-dimensional objects such as utility poles and use the three-dimensional object data for automatic avoidance of obstacles. For example, the microcomputer 12051 identifies obstacles around the vehicle 12100 as obstacles that can be visually recognized by the driver of the vehicle 12100 and obstacles that are difficult to visually recognize. Then, the microcomputer 12051 determines a collision risk indicating a degree of risk of collision with each obstacle, and when the collision risk is equal to or higher than a set value and there is a possibility of collision, the microcomputer can perform driving assistance for collision avoidance by outputting an alarm to the driver via the audio speaker 12061 or the display unit 12062 or performing forced deceleration or avoidance steering via the drive system control unit 12010.

At least one of the imaging units 12101 to 12104 may be an infrared camera that detects infrared light. For example, the microcomputer 12051 can recognize a pedestrian by determining whether or not a pedestrian is present in the captured images of the imaging units 12101 to 12104. Such pedestrian recognition is performed through, for example, procedure of extracting feature points in the captured images of the imaging units 12101 to 12104 that are infrared cameras, and procedure of performing pattern matching processing on a series of feature points indicating outline of an object to determine whether or not the object is a pedestrian. If the microcomputer 12051 determines that a pedestrian is present in the captured images of the imaging units 12101 to 12104 and recognizes the pedestrian, the audio/image output unit 12052 controls the display unit 12062 to superimpose and display square contour for emphasis on the recognized pedestrian. Furthermore, the audio/image output unit 12052 may control the display unit 12062 to display an icon, or the like, indicating a pedestrian at a desired position.

An example of the vehicle control system to which the technology according to the present disclosure can be applied has been described above. The technology according to the present disclosure can be applied to, for example, the imaging unit 12031 among the above-described components. Specifically, the imaging circuit or the imaging device described above can be mounted on the imaging unit 12031. By applying the technology according to the present disclosure to the imaging unit 12031, accurate distance information can be obtained in an environment of a wide brightness dynamic range, so that functionality and safety of the vehicle 12100 can be improved.

Note that the present technology can have the following configurations.

(1)
An imaging circuit including:
a plurality of circuit blocks each including a photoelectric conversion element configured to photoelectrically convert incident light to generate a photocurrent, and a current-voltage conversion circuit configured to convert the photocurrent into a voltage signal;
a quantizer configured to generate a detection signal of an address event in accordance with a result of comparing the voltage signal supplied from at least one of the plurality of circuit blocks with a threshold;
a demultiplexer connected to a subsequent stage of the quantizer; and
a plurality of latch circuits connected to different output terminals of the demultiplexer.

(2)
The imaging circuit according to (1), in which
each of the plurality of latch circuits is configured to store the address event detected by the quantizer.

(3)
The imaging circuit according to (1) or (2), in which
the number of the latch circuits is equal to or larger than two and equal to or smaller than twice the number of the photoelectric conversion elements.

(4)
The imaging circuit according to any one of (1) to (3), in which
each of the plurality of circuit blocks includes a buffer circuit configured to perform impedance conversion, and a subtractor configured to convert the voltage signal into a differential voltage.

(5)
The imaging circuit according to any one of (1) to (4), in which
the quantizer detects an ON event in a case where the voltage signal supplied from at least one of the plurality of circuit blocks exceeds a first threshold voltage.

(6)
The imaging circuit according to (5), in which
the quantizer detects an OFF event in a case where the voltage signal supplied from at least one of the plurality of circuit blocks falls below a second threshold voltage.

(7)
The imaging circuit according to (6), in which
the imaging circuit is configured to read both the ON events and the OFF events for at least some selected photoelectric conversion elements among the plurality of photoelectric conversion elements and store the ON events and the OFF events in the plurality of latch circuits.

(8)
The imaging circuit according to (7), in which
the imaging circuit is configured to read both the ON events and the OFF events for the remaining photoelectric conversion elements among the plurality of photoelectric conversion elements after the ON events and the OFF events stored in the plurality of latch circuits are transferred via read lines and store the ON events and the OFF events in the plurality of latch circuits.

(9)
The imaging circuit according to any one of (1) to (8), in which
a plurality of the photoelectric conversion elements is arranged in a direction substantially perpendicular to read lines.

(10)
The imaging circuit according to any one of (1) to (9), in which
a plurality of the photoelectric conversion elements is arranged in a direction substantially parallel to read lines.

(11)
An imaging device including:
a storage unit; and
a plurality of the imaging circuits according to any one of (1) to (4), in which
a plurality of latch circuits respectively included in the imaging circuits is connected to different read lines, the corresponding latch circuits of the plurality of imaging circuits are connected to the same read line, and the storage unit is connected to a subsequent stage of a plurality of the read lines.

(12)
The imaging device according to (11), in which
the imaging device is configured to transfer the address event stored in the latch circuit to the storage unit for each of the imaging circuits.

(13)
The imaging device according to (11), in which
the imaging device is configured to alternately read an ON event or an OFF event stored in the latch circuit and transfer the ON event or the OFF event to the storage unit for each of the imaging circuits.

(14)
An imaging device including:
a storage unit; and
a plurality of the imaging circuits according to any one of (1) to (4), in which a plurality of latch circuits respectively included in the imaging circuits is connected to some of a plurality of the read lines, the plurality of latch circuits respectively included in the imaging circuits is divided into groups each connected to the same read line, and the read lines to which the plurality of latch circuits is connected are different depending on the imaging circuits, and the storage unit is connected to a subsequent stage of a plurality of the read lines.

(15)
The imaging device according to (14), in which
the imaging device is configured to read the address event stored in one of the latch circuits belonging to each of the groups for a plurality of the imaging circuits and transfer the address event to the storage unit.

(16)
The imaging device according to (15), in which
the address event read from each of the imaging circuits and transferred to the storage unit includes both an ON event and an OFF event.

(17)
The imaging device according to (15), in which
the imaging device is configured to alternately read ON events or OFF events stored in the latch circuits for the plurality of imaging circuits and transfer the ON events or the OFF events to the storage unit.

(18)
An imaging method including:
a step of outputting a voltage signal from at least one of a plurality of circuit blocks each including a photoelectric conversion element configured to photoelectrically convert incident light to generate a photocurrent and a current-voltage conversion circuit configured to convert the photocurrent into the voltage signal and supplying the voltage signal to a quantizer;

a step of generating, at the quantizer, a detection signal of an address event in accordance with a result of comparing the voltage signal with a threshold;

a step of outputting the detection signal generated by the quantizer while demultiplexing the detection signal into a plurality of systems at a demultiplexer; and a step of latching the detection signal at a plurality of latch circuits corresponding to the plurality of systems.

Aspects of the present disclosure are not limited to the above-described individual embodiments, but include various modifications that can be conceived by those skilled in the art, and the effects of the present disclosure are not limited to the above-described content. In other words, various additions, modifications, and partial deletions can be made without departing from the conceptual idea and spirit of the present disclosure derived from the contents defined in the claims and equivalents thereof.

REFERENCE SIGNS LIST

PD Photodiode
2 Current-voltage conversion circuit
3 Buffer
4 Subtractor
5 Quantizer
6 Transfer circuit
23 Multiplexer
24 Demultiplexer
25, 25a, 25b, 25c, 25d, 40 Latch circuit
26a, 26b, 25c, 25d Read circuit
41, 44 Switch
42, 43 Inverter
45, 45A Memory
50, 51, 52, 53 Imaging circuit
100 Imaging device

The invention claimed is:

1. An imaging circuit comprising:
a plurality of circuit blocks each including a photoelectric conversion element configured to photoelectrically convert incident light to generate a photocurrent, and a current-voltage conversion circuit configured to convert the photocurrent into a voltage signal;

a quantizer configured to generate a detection signal of an address event in accordance with a result of comparing the voltage signal supplied from at least one of the plurality of circuit blocks with a threshold;

a demultiplexer connected to a subsequent stage of the quantizer; and a plurality of latch circuits connected to different output terminals of the demultiplexer, wherein the number of the latch circuits is equal to or larger than two and equal to or smaller than twice the number of the photoelectric conversion elements.

2. The imaging circuit according to claim 1, wherein
each of the plurality of latch circuits is configured to store the address event detected by the quantizer.

3. The imaging circuit according to claim 1, wherein
each of the plurality of circuit blocks includes a buffer circuit configured to perform impedance conversion, and a subtractor configured to convert the voltage signal into a differential voltage.

4. The imaging circuit according to claim 1, wherein
the quantizer detects an ON event in a case where the voltage signal supplied from at least one of the plurality of circuit blocks exceeds a first threshold voltage.

5. The imaging circuit according to claim 4, wherein
the quantizer detects an OFF event in a case where the voltage signal supplied from at least one of the plurality of circuit blocks falls below a second threshold voltage.

6. The imaging circuit according to claim 5, wherein
the imaging circuit is configured to read both the ON events and the OFF events for at least some selected photoelectric conversion elements among the plurality of photoelectric conversion elements and store the ON events and the OFF events in the plurality of latch circuits.

7. An imaging circuit comprising:
a plurality of circuit blocks each including a photoelectric conversion element configured to photoelectrically convert incident light to generate a photocurrent, and a current-voltage conversion circuit configured to convert the photocurrent onto a voltage signal;

a quantizer configured to generate a detection signal of an address event in accordance with a result of comparing the voltage signal supplied from at least one of the plurality of circuit blocks with a threshold;

a demultiplexer connected to a subsequent stage of the quantizer; and a plurality of latch circuits connected to different output terminals of the demultiplexer, wherein the quantizer detects on ON event in a case where the voltage signal supplied from at least one of the plurality of circuit blocks exceeds a first threshold voltage, the quantizer detects an OFF event in a case where the voltage signal supplied from at least one of the plurality of circuit blocks falls below a second threshold voltage, the imaging circuit is configured to read both the ON events and the OFF events for at least some selected photoelectric conversion elements among the plurality of photoelectric conversion elements and store the ON events and the OFF events in the plurality of latch circuits, and the imaging circuit is configured to read both the ON events and the OFF events for the remaining photoelectric conversion elements among the plurality of photoelectric conversion elements after the ON events and the OFF events stored in the plurality of latch circuits are transferred via read lines and store the ON events and the OFF events in the plurality of latch circuits.

8. The imaging circuit according to claim 1, wherein a plurality of the photoelectric conversion elements is arranged in a direction substantially perpendicular to read lines.

9. The imaging circuit according to claim 1, wherein a plurality of the photoelectric conversion elements is arranged in a direction substantially parallel to read lines.

10. An imaging device comprising:
a plurality of imaging circuits, each of the imaging circuits including;
a plurality of circuit blocks each including a photoelectric conversion element configured to photoelectrically convert incident light to generate a photocurrent, and a current-voltage conversion circuit configured to convert the photocurrent into a voltage signal;
a quantizer configured to generate a detection signal of an address event in accordance with a result of comparing the voltage signal supplied from at least one of the plurality of circuit blocks with a threshold;
a demultiplexer connected to a subsequent stage of the quantizer; and
a plurality of latch circuits connected to different output terminals of the demultiplexer, wherein
the plurality of latch circuits respectively included in separate ones of the imaging circuits is connected to a respective different read line of a plurality of read lines, the plurality if latch circuits within each of the imaging circuits are connected to a same read line of the plurality of read lines, and a storage unit is connected to a subsequent stage of the plurality of read lines, and wherein
the imaging device is configured to alternately read an ON event or an OFF event stored in the respectively latch circuits and transfer the ON event or the OFF event to the storage unit for each of the imaging circuits.

11. An imaging device comprising:
a plurality of imaging circuits, each of the imaging circuits including:
a plurality of circuit blocks each including a photoelectric conversion element configured to photoelectrically convert incident light to generate a photocurrent, and a current-voltage conversion circuit configured to convert the photocurrent into a voltage signal;
a quantizer configured to generate a detection signal of an address event in accordance with a result of comparing the voltage supplied from at least one of the plurality of circuit blocks with a threshold;
a demultiplexer connected to a subsequent stage of the quantizer; and
a plurality of latch circuits connected to different output terminals of the demultiplexer, wherein
the plurality of latch circuits respectively included in the imaging circuits is connected to some of a plurality of read lines, the plurality of latch circuits respectively included in the imaging circuits is divided into groups each connected to a same read line of the plurality of read lines, and
the respective read lines to which the plurality of latch circuits is connected are different depending on the imaging circuits, and a storage unit is connected to a subsequent stage of the plurality of the read lines.

12. The imaging device according to claim 11, wherein the imaging device is configured to read the address event stored in one of the latch circuits belonging to each of the groups for a plurality of the imaging circuits and transfer the address event to the storage unit.

13. The imaging device according to claim 12, wherein the address event read from each of the imaging circuits and transferred to the storage unit includes both an ON event and an OFF event.

14. The imaging device according to claim 12, wherein the imaging device is configured to alternately read ON events or OFF events stored in the latch circuits and transfer the ON events or the OFF events to the storage unit for the plurality of imaging circuits.

15. An imaging method comprising:
outputting a voltage signal from at least one of a plurality of circuit blocks each including a photoelectric conversion element configured to photoelectrically convert incident light to generate a photocurrent and a current-voltage conversion circuit configured to convert the photocurrent into the voltage signal and supplying the voltage signal to a quantizer;
generating, at the quantizer, a detection signal of an address event in accordance with a result of comparing the voltage signal with a threshold; outputting the detection signal generated by the quantizer while demultiplexing the detection signal into a plurality of systems at a demultiplexer; and
latching the detection signal at a plurality of latch circuits corresponding to the plurality of systems, wherein
the number of the latch circuits is equal to or larger than two and equal to or smaller than twice the number of the photoelectric conversion elements.

* * * * *